United States Patent
Lu et al.

(10) Patent No.: US 12,497,071 B2
(45) Date of Patent: Dec. 16, 2025

(54) PREDICTED MOVING TRAJECTORY PROCESSING METHOD AND APPARATUS, AND CONSTRAINT BARRIER DISPLAY METHOD AND APPARATUS

(71) Applicant: SHENZHEN YINWANG INTELLIGENT TECHNOLOGIES CO., LTD., Shenzhen (CN)

(72) Inventors: Mengyu Lu, Shenzhen (CN); Xiaohong Zhang, Shenzhen (CN); Jieyun Ding, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 295 days.

(21) Appl. No.: 17/856,088

(22) Filed: Jul. 1, 2022

(65) Prior Publication Data
US 2022/0340167 A1    Oct. 27, 2022

Related U.S. Application Data

(63) Continuation of application No. PCT/CN2020/070008, filed on Jan. 2, 2020.

(51) Int. Cl.
*B60W 60/00* (2020.01)
*B60W 30/095* (2012.01)
(Continued)

(52) U.S. Cl.
CPC .... *B60W 60/0011* (2020.02); *B60W 30/0956* (2013.01); *B60W 30/16* (2013.01);
(Continued)

(58) Field of Classification Search
None
See application file for complete search history.

(56) References Cited

U.S. PATENT DOCUMENTS

| | | | |
|---|---|---|---|
| 2006/0047409 A1* | 3/2006 | Oka | G08G 1/166 701/117 |
| 2013/0054106 A1 | 2/2013 | Dderich et al. | |

(Continued)

FOREIGN PATENT DOCUMENTS

| | | |
|---|---|---|
| CN | 107161141 A | 9/2017 |
| CN | 108225364 A | 6/2018 |

(Continued)

OTHER PUBLICATIONS

Cheng, [online], "Apollo 5.0 Obstacle Behavior Prediction Technology," CNBLOGS, Aug. 21, 2019, Retrieved on Feb. 15, 2023, Retrieved from URL <https://www.cnblogs.com/liuzubing/p/11388485.html>, 28 pages (with English machine translation).

(Continued)

*Primary Examiner* — Hongye Liang
(74) *Attorney, Agent, or Firm* — Fish & Richardson P.C.

(57) ABSTRACT

Embodiments of this application provides example methods, media, and apparatuses for predicting moving trajectory of a target object. One example method includes obtaining a candidate moving trajectory, where the candidate moving trajectory is a motion trajectory that is of the target object in future period and that is obtained by using a prediction method, and the target object is in a sensing range of an ego vehicle. Environmental information is obtained within the sensing range. A constraint barrier is generated based on the environmental information, where the constraint barrier is used to indicate an area through which the target object is constrained to pass. The candidate moving trajectory is processed based on the constraint barrier.

20 Claims, 13 Drawing Sheets

(51) Int. Cl.
  *B60W 30/16* (2020.01)
  *B60W 40/04* (2006.01)
  *B60W 40/06* (2012.01)
  *B60W 50/00* (2006.01)
(52) U.S. Cl.
  CPC ............ *B60W 40/04* (2013.01); *B60W 40/06* (2013.01); *B60W 50/0097* (2013.01); *B60W 60/00274* (2020.02); *B60W 2554/4045* (2020.02); *B60W 2554/80* (2020.02); *B60W 2555/60* (2020.02)

(56) References Cited

U.S. PATENT DOCUMENTS

| | | | |
|---|---|---|---|
| 2017/0021864 A1 | 1/2017 | Sonntag et al. | |
| 2021/0094548 A1* | 4/2021 | Komoguchi | B60W 30/18154 |
| 2021/0237769 A1* | 8/2021 | Ostafew | B60W 30/18159 |

FOREIGN PATENT DOCUMENTS

| | | |
|---|---|---|
| CN | 109572694 A | 4/2019 |
| CN | 109782763 A | 5/2019 |
| CN | 110168312 A | 8/2019 |
| CN | 110487288 A | 11/2019 |
| CN | 110517483 A | 11/2019 |
| DE | 102012008659 A1 | 11/2012 |
| EP | 3032454 A1 | 6/2016 |
| WO | 2019231455 A1 | 12/2019 |

OTHER PUBLICATIONS

Bansal et al., "ChauffeurNet: Learning to Drive by Imitating the Best and Synthesizing the Worst," Submitted on Dec. 7, 2018, arXiv:1812.03079v1, 20 pages.

Dong et al., "Intention Estimation For Ramp Merging Control In Autonomous Driving," 2017 IEEE Intelligent Vehicles Symposium (IV), Redondo Beach, CA, USA, Jun. 11-14, 2017, 6 pages.

Extended European Search Report in European Appln No. 20909358. 2, dated Nov. 29, 2022, 6 pages.

International Search Report and Written Opinion in International Appln. No. PCT/CN2020/070008, mailed on Sep. 27, 2020, 20 pages (with English translation).

Office Action in Chinese Appln. No. 202080002621.7, dated Apr. 29, 2023, 8 pages.

* cited by examiner

PREDICTED MOVING TRAJECTORY PROCESSING METHOD AND APPARATUS, AND CONSTRAINT BARRIER DISPLAY METHOD AND APPARATUS

CROSS-REFERENCE TO RELATED APPLICATIONS

This application is a continuation of International Application No. PCT/CN2020/070008, filed on Jan. 2, 2020, the disclosure of which is hereby incorporated by reference in its entirety.

TECHNICAL FIELD

This application relates to the autonomous driving field, and in particular, to a method for predicting vehicle's moving trajectory.

BACKGROUND

As one of the core modules in an automated driving system (ADS, automated driving system) or advanced driver assistance systems (ADAS, Advanced Driver Assistance Systems), a prediction module is configured to infer possible behavior and/or a moving trajectory of a moving object at a future moment based on related information (for example, position, speed, and direction of the moving object) of the moving object sensed by an upstream module and with reference to environmental information (road topology structure, traffic signal light, interaction behavior, and the like) about environment around an ego vehicle. A prediction result of the prediction module can be used as input information for decision-making and planning performed by a downstream module. Rational decision-making and planning can effectively reduce traffic accident occurrence rate. As a matter of fact, the prediction module plays a key role as an intermediate part of the ADS or the ADAS, and whether the prediction module's result is accurate has a significant impact on reliability of an automatic driving function.

Moving object prediction can be classified into three categories, i.e.: motor vehicle prediction, non-motor vehicle prediction, and pedestrian prediction. The possible behavior and/or the trajectory of the moving object at the future moment is inferred. In the traditional moving trajectory prediction field, since the information used in the prediction course may not be comprehensive and there exist error in the result of the prediction algorithm, an unreasonable prediction result of the moving trajectory may be occurred. This further affects a subsequent decision-making and planning process, and greatly affects automatic driving security, reliability, and comfort.

SUMMARY

To resolve a prior-art technical problem of an irrational predicted moving trajectory, embodiments of this application provide a predicted moving trajectory processing method, so that a predicted moving trajectory is more realistic and more rational through subsequent processing.

According to a first aspect, an embodiment of this application provides a predicted moving trajectory processing method. The method includes: obtaining a candidate moving trajectory, where the candidate moving trajectory is a motion trajectory that is of a target object in a future time period and that is obtained by using a prediction method, and the target object is in a sensing range of an ego vehicle; obtaining environmental information within the sensing range of the ego vehicle, and generating a constraint barrier based on the environmental information, where the constraint barrier is used to indicate an area in which the target object can be constrained to pass; and processing the candidate moving trajectory based on the constraint barrier. Further processing is performed, by using the constraint barrier generated based on the environmental information, on the predicted moving trajectory, to obtain a more realistic and rational predicted moving trajectory. The processed moving trajectory is more accurate, so that decision-making and planning used in the autonomous driving field is more secure, more reliable, and more comfortable. Optionally, the sensing range of the ego vehicle includes an area that can be learned of by the ego vehicle by using a sensing device or/and a V2X system configured on the ego vehicle, or may be understood as an area that needs to be sensed by the ego vehicle. In the predicted moving trajectory processing method provided in this embodiment of this application, a prediction method for inferring the moving trajectory is not limited.

In a possible implementation of the first aspect, the obtaining environmental information within the sensing range specifically includes: obtaining a road boundary of a target road in the sensing range and drivable area drivable area observation information of the target road in the sensing range, where the target road is a road on which the ego vehicle is located. In this case, the generating a constraint barrier based on the environmental information specifically includes: obtaining an occupied road boundary based on the road boundary and the drivable area observation information, where the occupied road boundary indicates a road boundary occupied by an obstacle; and setting the constraint barrier at the occupied road boundary. With reference to a road boundary attribute and the drivable area drivable area observation information, an impassable boundary on the road may be inferred. More environment semantic information is introduced, to improve a capability of understanding the environment. Therefore, the processed moving trajectory can be more accurate and more rational. The constraint barrier generated based on the road boundary and the drivable area drivable area observation information is usually a hard constraint. In other words, the constraint barrier is an area in which the moving trajectory is not allowed to pass through. Introducing such a hard constraint can correct or remove a trajectory that crosses the hard constraint, so that a prediction result is more accurate and more realistic.

In a possible implementation of the first aspect, the obtaining an occupied road boundary based on the road boundary and the drivable area observation information includes: projecting the drivable area observation information onto the road boundary, and converting grid information in observation information projected onto the road boundary into a grid occupation probability of a corresponding grid, where the grid occupation probability indicates a possibility that the corresponding grid is occupied; and obtaining the occupied road boundary based on the grid occupation probability by using a sampling manner and a preset rule.

In a possible implementation of the first aspect, the obtaining the occupied road boundary based on the grid occupation probability by using a sampling manner and a preset rule specifically includes: performing sampling at intervals of a preset distance along the road boundary to obtain a plurality of sampling points; obtaining a grid occupation probability of a grid in which each of the plurality of sampling points is located; and obtaining the occupied road according to the grid occupation probability of the grid in which each of the plurality of sampling points is located and the preset rule.

In a possible implementation of the first aspect, the obtaining the occupied road according to the grid occupation probability of the grid in which each of the plurality of sampling points is located and the preset rule specifically includes: determining whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determining that the road boundary is the occupied road. Optionally, when whether the road boundary is the occupied road is determined based on that a grid occupation probability of a grid in which the consecutive sampling points are located is greater than the preset threshold, the preset quantity may be set to 6, and the preset threshold may be set to 0.5. Optionally, when whether the road boundary is the occupied road is determined based on that a grid occupation probability of a grid in which the nonconsecutive sampling points are located is greater than the preset threshold, the preset quantity may be set to 12, and the preset threshold may be set to 0.5.

In a possible implementation of the first aspect, the obtaining environmental information within the sensing range includes: obtaining a gap GAP on a target road in the sensing range, where the target road is a road on which the ego vehicle is located, and the GAP is a gap between a front vehicle and a rear vehicle. In this case, the generating a constraint barrier based on the environmental information includes: calculating a cross probability of the GAP, where the cross probability indicates a possibility that a moving object on the target road may cross the GAP; obtaining a target vehicle flow based on the cross probability and the GAP, where the target vehicle flow includes an area from a front edge of the front vehicle to a rear edge of the rear vehicle in vehicles before and after the GAP; and setting the constraint barrier at the target vehicle flow. The constraint barrier generated based on the vehicle flow is a soft constraint. Driving behavior of moving objects varies greatly. There is radical driving behavior and conservative driving behavior. It is difficult to accurately predict an intention of preempt or giving a way of each object. Vehicle flow information can be introduced to process the predicted moving trajectory at an interaction layer. This can effectively predict whether a possibility of the intention of preempt or giving the way exists, and improve right of way of the vehicle flow in a right of way factor. Accuracy of interactive prediction is improved, complexity of the interactive prediction is reduced, and a calculation workload is reduced based on certainty of an interaction scenario between a single-vehicle and the vehicle flow. A smaller GAP indicates that the vehicle flow is formed more easily. Optionally, if the cross probability is less than 0.5, it is considered that the vehicles before and after the GAP form the vehicle flow.

In a possible implementation of the first aspect, the calculating a cross probability of the GAP specifically includes: evaluating whether the vehicles before and after the GAP form a vehicle flow to obtain an evaluation result; and calculating the cross probability of the GAP based on the evaluation result.

In a possible implementation of the first aspect, the obtaining environmental information within the sensing range specifically includes: obtaining a state of a traffic signal light on a target road in the sensing range, where the target road is a road on which the ego vehicle is located, and the state of the traffic signal light includes a passable state and an impassable state. In this case, the generating a constraint barrier based on the environmental information specifically includes: setting the constraint barrier at a stop line of a lane corresponding to a traffic signal light in the impassable state. The constraint barrier generated based on the state of traffic signal light is a soft constraint, and is configured to restrain dynamic driving behavior and reduce an irrational prediction result. In addition, the soft constraint can be broken when a traffic participant violates a traffic rule. Therefore, violation can be taken into account. Optionally, if the state of the traffic signal light corresponding to a lane in which the ego vehicle is located is a red light, the constraint barrier is set at a stop line of the lane in which the ego vehicle is located and a lane in a same direction as the lane in which the ego vehicle is located. If the state of the traffic signal light corresponding to a lane in which the ego vehicle is located is a green light and the lane in which the ego vehicle is located is a straight lane, the constraint barrier is set at a stop line of a left-turn lane opposite to the lane in which the ego vehicle is located. If the state of the traffic signal light corresponding to a lane in which the ego vehicle is located is a green light and the lane in which the ego vehicle is located is a left-turn lane, the constraint barrier is set at a stop line of a straight lane opposite to the lane in which the ego vehicle is located. If the state of the traffic signal light corresponding to a lane in which the ego vehicle is located is a green light and the lane in which the ego vehicle is located is a straight lane, the constraint barrier is set at a stop line of a straight lane and/or a left-turn lane on a side of the lane in which the ego vehicle is located. The method may further include: detecting whether the target object violates a traffic rule of the traffic signal light; and if the target object is detected to violate the traffic rule of the traffic signal light, removing the corresponding constraint barrier, namely, skipping setting the constraint barrier.

In a possible implementation of the first aspect, the processing the candidate moving trajectory based on the constraint barrier specifically includes: determining whether the candidate moving trajectory intersects the constraint barrier; and if the candidate moving trajectory intersects the constraint barrier, reducing a prediction result probability of the candidate moving trajectory. Optionally, a to-be-reduced amplitude in a prediction result probability of the candidate moving trajectory that intersects the constraint barrier of the hard constraint is greater than a to-be-reduced amplitude in a prediction result probability of the candidate moving trajectory that intersects the constraint barrier of the soft constraint. The prediction result probability of the candidate moving trajectory that intersects the constraint barrier of the hard constraint may usually be reduced to 0. In other words, the candidate moving trajectory is removed from the predicted candidate moving trajectory.

In a possible implementation of the first aspect, the processing the candidate moving trajectory based on the constraint barrier specifically includes: determining whether the candidate moving trajectory intersects the constraint barrier; and if the candidate moving trajectory intersects the constraint barrier, truncating the candidate moving trajectory at an intersection position. The truncation indicates clearing a trajectory point between an intersection point and an end point of the candidate moving trajectory.

In a possible implementation of the first aspect, before the truncating the candidate moving trajectory at a position at which the candidate moving trajectory intersects the constraint barrier, the method further includes: obtaining, based on a speed of the target object and preset deceleration, that the target object moving along the candidate moving trajectory cannot brake before touching the constraint barrier. Optionally, the preset deceleration may be set to 3 m/m².

In a possible implementation of the first aspect, the truncating the candidate moving trajectory at a position at which the candidate moving trajectory intersects the constraint barrier specifically includes: obtaining a first intersection point, where the first intersection point is an intersection point that is closest to a start end of the candidate moving trajectory and that is in intersection points of the candidate moving trajectory and the constraint barrier; and truncating the candidate moving trajectory at the first intersection point, namely, clearing a trajectory point between the first intersection point and the end point of the candidate moving trajectory.

In a possible implementation of the first aspect, the processing the candidate moving trajectory based on the constraint barrier specifically includes: determining whether the candidate moving trajectory intersects the constraint barrier; and if the candidate moving trajectory intersects the constraint barrier, bypassing the candidate moving trajectory along the constraint barrier, to prevent the candidate moving trajectory crossing the constraint barrier and prevent the candidate moving trajectory from intersecting the constraint barrier through the processing. Specifically, a bypass trajectory segment is obtained by translating a virtual barrier contour.

In a possible implementation of the first aspect, before the bypassing the candidate moving trajectory along the constraint barrier, the method further includes: obtaining, based on a speed of the target object and preset deceleration, that the target object moving along the candidate moving trajectory can brake before touching the constraint barrier. Optionally, the preset deceleration may be set to 3 m/m².

In a possible implementation of the first aspect, the processing the candidate moving trajectory based on the constraint barrier specifically includes: determining whether the candidate moving trajectory intersects the constraint barrier; and if the candidate moving trajectory intersects the constraint barrier, processing the candidate moving trajectory. The constraint barrier is used as a criterion for determining whether the predicted moving trajectory is rational. That the predicted moving trajectory intersects the constraint barrier indicates that the moving trajectory is irrational, and the candidate moving trajectory needs to be processed, so that the candidate moving trajectory is more realistic.

In a possible implementation of the first aspect, the method further includes: outputting a processed candidate moving trajectory. The predicted candidate moving trajectory may be input to a downstream processing module (for example, a decision-making and planning module) after being processed, or may be input to another module/apparatus that need the moving trajectory.

In a possible implementation of the first aspect, the method further includes: displaying an image including a positional relationship between the ego vehicle and the constraint barrier. The image is used to prompt a user about the environmental information. The user can intuitively learn about a surrounding scenario and obtain a more vivid prediction result. Further, a constrained moving trajectory and an unconstrained moving trajectory are distinguished by colors.

From a perspective of a system, the predicted moving trajectory processing method in this embodiment of this application is used in a post-processing process of a trajectory prediction subsystem, so that the trajectory prediction subsystem obtains a more rational and more accurate predicted moving trajectory.

According to a second aspect, an embodiment of this application provides a constraint barrier display method. The method includes: obtaining a live image of a sensing range of an ego vehicle and displaying the live image; obtaining environmental information within the sensing range, and generating a constraint barrier based on the environmental information, where the constraint barrier is used to indicate an area in which a moving object can be constrained to pass; and displaying the constraint barrier in the live image. Optionally, the sensing range of the ego vehicle includes an area that can be learned of by the ego vehicle by using a sensing device or/and a V2X system configured on the ego vehicle, or may be understood as an area that needs to be sensed by the ego vehicle.

In a possible implementation of the second aspect, the obtaining environmental information within the sensing range includes: obtaining a road boundary of a target road in the sensing range and drivable area drivable area observation information of the target road in the sensing range, where the target road is a road on which the ego vehicle is located. The generating a constraint barrier based on the environmental information includes: obtaining an occupied road boundary based on the road boundary and the drivable area observation information, where the occupied road boundary indicates a road boundary occupied by an obstacle; and setting the constraint barrier at the occupied road boundary.

In a possible implementation of the second aspect, the obtaining an occupied road boundary based on the road boundary and the drivable area observation information includes: projecting the drivable area observation information onto the road boundary, and converting grid information in observation information projected onto the road boundary into a grid occupation probability of a corresponding grid, where the grid occupation probability indicates a possibility that the corresponding grid is occupied; and obtaining the occupied road boundary based on the grid occupation probability by using a sampling manner and a preset rule.

In a possible implementation of the second aspect, the obtaining the occupied road boundary based on the grid occupation probability by using a sampling manner and a preset rule includes: performing sampling at intervals of a preset distance along the road boundary to obtain a plurality of sampling points; obtaining a grid occupation probability of a grid in which each of the plurality of sampling points is located; and obtaining the occupied road according to the grid occupation probability of the grid in which each of the plurality of sampling points is located and the preset rule.

In a possible implementation of the second aspect, the obtaining the occupied road according to the grid occupation probability of the grid in which each of the plurality of sampling points is located and the preset rule includes: determining whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determining that the road boundary is the occupied road. Optionally, when whether the road boundary is the occupied road is determined based on that a grid occupation probability of a grid in which the consecutive sampling points are located is greater than the preset threshold, the preset quantity may be set to 6, and the preset threshold may be set to 0.5. Optionally, when whether the road boundary is the occupied road is determined based on that a grid occupation probability of a grid in which the nonconsecutive sampling points are located is greater than the preset threshold, the preset quantity may be set to 12, and the preset threshold may be set to 0.5.

In a possible implementation of the second aspect, the obtaining environmental information within the sensing range includes: obtaining a gap GAP on a target road in the sensing range, where the target road is a road on which the ego vehicle is located, and the GAP is a gap between a front vehicle and a rear vehicle. The generating a constraint barrier based on the environmental information includes: calculating a cross probability of the GAP, where the cross probability indicates a possibility that a moving object on the target road may cross the GAP; obtaining a target vehicle flow based on the cross probability and the GAP, where the target vehicle flow includes an area from a front edge of the front vehicle to a rear edge of the rear vehicle in vehicles before and after the GAP; and setting the constraint barrier at the target vehicle flow. A smaller GAP indicates that the vehicle flow is formed more easily. Optionally, if the cross probability is less than 0.5, it is considered that the vehicles before and after the GAP form the vehicle flow.

In a possible implementation of the second aspect, the calculating a cross probability of the GAP includes: evaluating whether the vehicles before and after the GAP form a vehicle flow to obtain an evaluation result; and calculating the cross probability of the GAP based on the evaluation result.

In a possible implementation of the second aspect, the obtaining environmental information within the sensing range includes: obtaining a state of a traffic signal light on a target road in the sensing range, where the target road is a road on which the ego vehicle is located, and the state of the traffic signal light includes a passable state and an impassable state. The generating a constraint barrier based on the environmental information includes: setting the constraint barrier at a stop line of a lane corresponding to a traffic signal light in the impassable state.

According to a third aspect, an embodiment of this application provides a predicted moving trajectory processing apparatus, configured to implement the method described in the first aspect and the possible implementations of the first aspect. The apparatus includes modules/units that can implement the method described in the first aspect and the possible implementations of the first aspect.

According to a fourth aspect, an embodiment of this application provides a constraint barrier display apparatus, configured to implement the method described in the second aspect and the possible implementations of the second aspect. The apparatus includes modules/units that can implement the method described in the second aspect and the possible implementations of the second aspect.

According to a fifth aspect, an embodiment of this application provides a predicted moving trajectory processing device, including a processor and a memory. The processor is coupled to the memory. The memory is configured to store a program. The processor is configured to execute the program in the memory, so that the device performs the method described in the first aspect and the possible implementations of the first aspect.

According to a sixth aspect, an embodiment of this application provides a constraint barrier display device, including a processor and a memory. The processor is coupled to the memory. The memory is configured to store a program. The processor is configured to execute the program in the memory, so that the device performs the method described in the second aspect and the possible implementations of the second aspect.

According to a seventh aspect, an embodiment of this application provides a computer-readable storage medium, including a program. When the program runs on a computer, the computer is enabled to perform the method described in the first aspect and the possible implementations of the first aspect.

According to an eighth aspect, an embodiment of this application provides a computer-readable storage medium, including a program. When the program runs on a computer, the computer is enabled to perform the method described in the second aspect and the possible implementations of the second aspect.

According to a ninth aspect, an embodiment of this application provides a vehicle, including the predicted moving trajectory processing apparatus described in the third aspect or the predicted moving trajectory processing device described in the fifth aspect.

According to a tenth aspect, an embodiment of this application provides a vehicle, including the constraint barrier display apparatus described in the fourth aspect or the constraint barrier display device described in the sixth aspect.

According to an eleventh aspect, an embodiment of this application provides a moving trajectory prediction method. The method includes: obtaining environmental information around a target object; generating a constraint barrier based on the environmental information, where the constraint barrier is used to indicate an area in which the target object can be constrained to pass; and predicting a moving trajectory of the target object based on the constraint barrier and a prediction algorithm. The prediction algorithm is not limited, and may be that the constraint barrier is used as data input to a trained neural network, and then the trained neural network outputs the moving trajectory of the target object.

In a possible implementation of the eleventh aspect, the obtaining environmental information around a target object includes: obtaining a road boundary around the target object and drivable area drivable area observation information. The generating a constraint barrier based on the environmental information includes: obtaining an occupied road boundary based on the road boundary and the drivable area observation information, where the occupied road boundary indicates a road boundary occupied by an obstacle; and setting the constraint barrier at the occupied road boundary.

In a possible implementation of the eleventh aspect, the obtaining an occupied road boundary based on the road boundary and the drivable area observation information includes: projecting the drivable area observation information onto the road boundary, and converting grid information in observation information projected onto the road boundary into a grid occupation probability of a corresponding grid, where the grid occupation probability indicates a possibility that the corresponding grid is occupied; and obtaining the occupied road boundary based on the grid occupation probability by using a sampling manner and a preset rule.

In a possible implementation of the eleventh aspect, the obtaining the occupied road boundary based on the grid occupation probability by using a sampling manner and a preset rule includes: performing sampling at intervals of a preset distance along the road boundary to obtain a plurality of sampling points; obtaining a grid occupation probability of a grid in which each of the plurality of sampling points is located; and obtaining the occupied road according to the grid occupation probability of the grid in which each of the plurality of sampling points is located and the preset rule.

In a possible implementation of the eleventh aspect, the obtaining the occupied road according to the grid occupation probability of the grid in which each of the plurality of sampling points is located and the preset rule includes: determining whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determining that the road boundary is the occupied road.

In a possible implementation of the eleventh aspect, the obtaining environmental information around a target object includes: obtaining a gap GAP on a road around the target object, where the GAP is a gap between a front vehicle and a rear vehicle. The generating a constraint barrier based on the environmental information includes: calculating a cross probability of the GAP, where the cross probability indicates a possibility that a moving object on the target road may cross the GAP; obtaining a target vehicle flow based on the cross probability and the GAP, where the target vehicle flow includes an area from a front edge of the front vehicle to a rear edge of the rear vehicle in vehicles before and after the GAP; and setting the constraint barrier at the target vehicle flow.

In a possible implementation of the eleventh aspect, the calculating a cross probability of the GAP includes: evaluating whether the vehicles before and after the GAP form a vehicle flow to obtain an evaluation result; and calculating the cross probability of the GAP based on the evaluation result.

In a possible implementation of the eleventh aspect, the obtaining environmental information around a target object includes: obtaining a state of a traffic signal light on a road around the target object, where the state of the traffic signal light includes a passable state and an impassable state. The generating a constraint barrier based on the environmental information includes: setting the constraint barrier at a stop line of a lane corresponding to a traffic signal light in the impassable state. Optionally, if the state of the traffic signal light corresponding to the ego vehicle is a red light, the constraint barrier is set at a stop line of a lane in which the ego vehicle is located and a lane in a same direction as the lane in which the ego vehicle is located. If the state of the traffic signal light corresponding to the ego vehicle is a green light and a lane in which the ego vehicle is located is a straight lane, the constraint barrier is set at a stop line of a left-turn lane opposite to the lane in which the ego vehicle is located. If the state of the traffic signal light corresponding to the ego vehicle is a green light and a lane in which the ego vehicle is located is a left-turn lane, the constraint barrier is set at a stop line of a straight lane opposite to the lane in which the ego vehicle is located. If the state of the traffic signal light corresponding to the ego vehicle is a green light and a lane in which the ego vehicle is located is a straight lane, the constraint barrier is set at a stop line of a straight lane and/or a left-turn lane on a side of the lane in which the ego vehicle is located. The method may further include: detecting whether the target object violates a traffic rule of the traffic signal light; and if the target object is detected to violate the traffic rule of the traffic signal light, removing the constraint barrier, namely, skipping setting the constraint barrier.

According to a twelfth aspect, an embodiment of this application provides a moving trajectory prediction apparatus, configured to implement the method described in the eleventh aspect and the possible implementations of the eleventh aspect. The apparatus includes modules/units that can implement the method described in the eleventh aspect and the possible implementations of the eleventh aspect.

According to a thirteenth aspect, an embodiment of this application provides a moving trajectory prediction device, including a processor and a memory. The processor is coupled to the memory. The memory is configured to store a program. The processor is configured to execute the program in the memory, so that the device performs the method described in the eleventh aspect and the possible implementations of the eleventh aspect.

According to a fourteenth aspect, an embodiment of this application provides a computer-readable storage medium, including a program. When the program runs on a computer, the computer is enabled to perform the method described in the eleventh aspect and the possible implementations of the eleventh aspect.

According to a fifteenth aspect, an embodiment of this application provides a vehicle, including the moving trajectory prediction apparatus described in the twelfth aspect or the moving trajectory prediction device described in the thirteenth aspect.

BRIEF DESCRIPTION OF DRAWINGS

To describe technical solutions in embodiments of this application more clearly, the following describes the accompanying drawings for describing the embodiments of this application or the background.

DESCRIPTION OF EMBODIMENTS

To make objectives, technical solutions, and advantages of this application clearer, the following further describes the technical solutions of embodiments of this application in detail with reference to the accompanying drawings. Apparently, the described embodiments are merely some but not all of the embodiments of this application. All other embodiments obtained by persons skilled in the art based on the embodiments of this application without creative efforts shall fall within the protection scope of this application.

Figure 1:
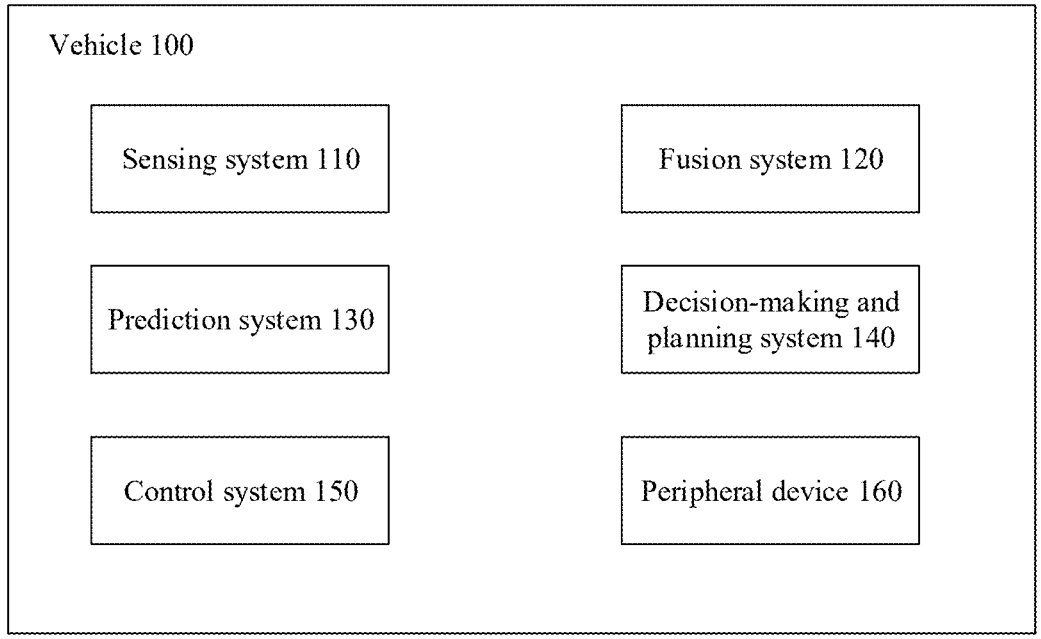
FIG. 1 is a schematic architectural diagram of a vehicle according to an embodiment of this application.

As shown in FIG. 1, an embodiment of this application provides a vehicle 100. In an embodiment, the vehicle 100 is configured to be in a fully or partially automatic driving mode. For example, the vehicle 100 in the automatic driving mode may control the vehicle 100. A manual operation may be performed to determine current states of the vehicle and a surrounding environment of the vehicle, determine possible behavior of at least one another vehicle in the surrounding environment, determine a confidence level corresponding to a possibility that the another vehicle performs the possible behavior, and control the vehicle 100 based on determined information. When the vehicle 100 is in the automatic driving mode, the vehicle 100 may be set to operate without interacting with a person.

The vehicle 100 may include various subsystems, such as a sensing system 110, a fusion system 120, a prediction system 130, a decision-making and planning system 140, a control system 150, and a peripheral device 160. Optionally, the vehicle 100 may include more or less subsystems, and each subsystem may include a plurality of elements. In addition, each subsystem and element of the vehicle 100 may be interconnected in a wired or wireless manner. The sensing system 110, the fusion system 120, the prediction system 130, and the decision-making and planning system 140 are core modules of an automated driving system (ADS, automated driving system) and/or advanced driver assistance systems (ADAS, Advanced Driver Assistance Systems).

The sensing system 110 may include several sensors configured to sense and detect surrounding environmental information of the vehicle 100. For example, the sensor system 110 may include a positioning system (the positioning system may be a GPS system, a BeiDou system, or another positioning system), an inertial measurement unit (inertial measurement unit, IMU), radar, a millimeter-wave radar, a lidar, and a camera. The sensor system 110 may further include sensors of an internal system of the monitored vehicle 100 (for example, an in-vehicle air quality monitor, a fuel flow meter, and an oil temperature gauge). One or more pieces of sensor data from these sensors can be used to detect objects and corresponding features (a position, a shape, a direction, a speed, and the like) of the objects. Such detection and recognition are key functions of security operations of the vehicle 100.

The fusion system 120 is a downstream module of the sensing system 110, and is mainly configured to fuse data input by the sensing system 110, and then output required data to a downstream module (for example, the prediction system 130). In an embodiment, the fusion system 120 may output data such as global positioning coordinates, relative positioning coordinates, a road structure model, a drivable area drivable area, and an occlusion area occlusion area to the prediction system 130.

The prediction system 130 plays a transition role in the ADS and/or the ADAS, and is mainly configured to perform inference on a moving object, a vehicle environment, and the like based on data input by an upstream module (for example, the sensing system 110 or the fusion system 120). One of key functions of the prediction system 130 is predicting possible behavior and/or a moving trajectory that are/is of the moving object at a future moment. The prediction system 130 then transmits an inference result to a downstream module (for example, the decision-making and planning system 140).

The decision-making and planning system 140 is equivalent to a main brain of the ADS and/or the ADAS. The decision-making and planning system 140 is mainly responsible for making a series of human-like decisions and planning (such as lane change, acceleration, and driving path planning) about driving, and transferring a decision-making and planning instruction to the control system 150 to control execution of the vehicle 100.

The vehicle 100 interacts with an external sensor, another vehicle, another computer system, or a user by using the peripheral device 160. The peripheral device 160 may include a wireless communications system, a vehicle-mounted computer, a microphone 0, and/or a speaker.

In some embodiments, the peripheral device 160 provides a means for a user of the vehicle 100 to interact with a user interface. For example, the vehicle-mounted computer may provide information for the user of the vehicle 100. The user interface may further operate the vehicle-mounted computer to receive input from the user. The vehicle-mounted computer may perform an operation by using a touchscreen. In another case, the peripheral device 160 may provide a means for the vehicle 100 to communicate with another device located in the vehicle. For example, the microphone may receive audio (for example, a voice command or other audio input) from the user of the vehicle 100. Likewise, the speaker may output audio to the user of the vehicle 100.

The wireless communications system may communicate wirelessly with one or more devices directly or over a communications network. For example, the wireless communications system may use 3G cellular communication, such as CDMA, EVD0, a GSM/GPRS. The wireless communications system may use 4G cellular communication, such as LTE. Alternatively, the wireless communications system may use 5G cellular communication. The wireless communications system may communicate with a wireless local area network (wireless local area network, WLAN) by using Wi-Fi. In some embodiments, the wireless communications system may directly communicate with a device through an infrared link, Bluetooth, or ZigBee. Other wireless protocols, for example, various vehicle communications systems, such as the wireless communications system may include one or more dedicated short-range communications (dedicated short range communications, DSRC) devices. These devices may include public and/or private data communication between the vehicle and/or a roadside station.

The vehicle 100 may join in a V2X (vehicle to everything, vehicle to everything information exchange) system by using the wireless communications system. The vehicle may further obtain more data and information by using the V2X system.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of the present invention.

Figure 2:
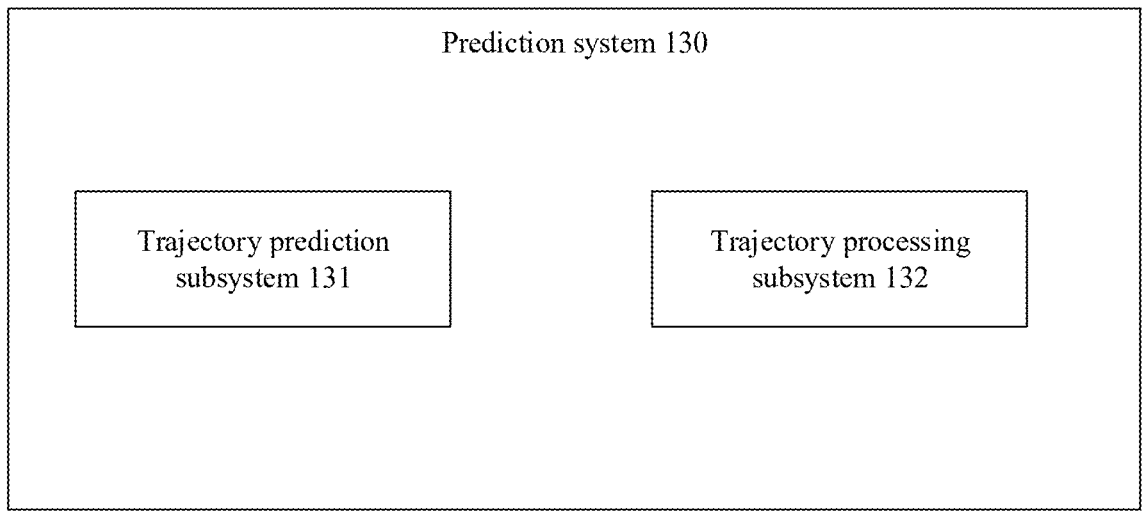
FIG. 2 is a schematic diagram of a structure of a prediction system according to an embodiment of this application.

As shown in FIG. 2, in this embodiment of this application, the prediction system 130 includes a trajectory prediction subsystem 131 and a trajectory processing subsystem 132. The trajectory prediction subsystem 131 is configured to predict the moving trajectory of the moving object based on the data input by the upstream module (for example, the sensing system 110, or the fusion system 120). The trajectory processing subsystem 132 obtains, from the trajectory prediction subsystem 131, a predicted moving trajectory of the moving object, processes the predicted moving trajectory based on environment data input by the upstream module (for example, the sensing system 110, or the fusion system 120), and outputs a processed moving trajectory to a corresponding downstream module (for example, the decision-making and planning system 140).

Further processing is performed on the predicted moving trajectory, to improve accuracy, reliability, and rationality of predicting the moving trajectory in an actual environment.

An embodiment of this application provides a moving object trajectory prediction method, and the method may be used in the autonomous driving field. Steps of the method are as follows:

Step 1: Obtain data related to predicting a moving trajectory, and predict a possible candidate moving trajectory of a target object in a future time period based on the obtained data. In this embodiment of this application, a specific method for predicting the possible candidate moving trajectory of the target object in the future time period in this step is not limited. The method may be any trajectory prediction method in the prior art. In specific implementation, several possible candidate moving trajectories are usually inferred for the target object. Each candidate moving trajectory has a corresponding prediction result probability. The prediction result probability is used to indicate a possibility that a corresponding candidate moving trajectory is a real moving trajectory of the target object in the future. Optionally, with reference to the prediction system 130 shown in FIG. 2, it may be understood that in the step 1, the trajectory prediction subsystem 131 may complete a moving trajectory inference process.

Step 2: Process the candidate moving trajectory predicted in the step 1. The step 2 is performed to improve accuracy, reliability, and rationality of predicting the moving trajectory. Optionally, with reference to the prediction system 130 shown in FIG. 2, it may be understood that in the step 2, the trajectory processing subsystem 132 may complete a further processing process of the moving trajectory.

Step 3: Output a processed candidate moving trajectory, for example, output the processed candidate moving trajectory to the decision-making and planning system 140 shown in FIG. 1. Alternatively, the processed moving trajectory is displayed with reference to data (for example, a live image or a geographical position) input by the sensing system 110. This helps the user to intuitively learn of a surrounding environment condition of the vehicle including a constraint barrier, to improve human-computer interaction experience.

According to the moving object trajectory prediction method provided in this embodiment of this application, the predicted moving trajectory can be further processed to improve the accuracy, the reliability, and the rationality of predicting the moving trajectory, and ensure stability, security, and reliability of the ADS and/or the ADAS.

The following describes in more detail, by using a specific embodiment, a predicted moving trajectory processing method.

Figure 3:
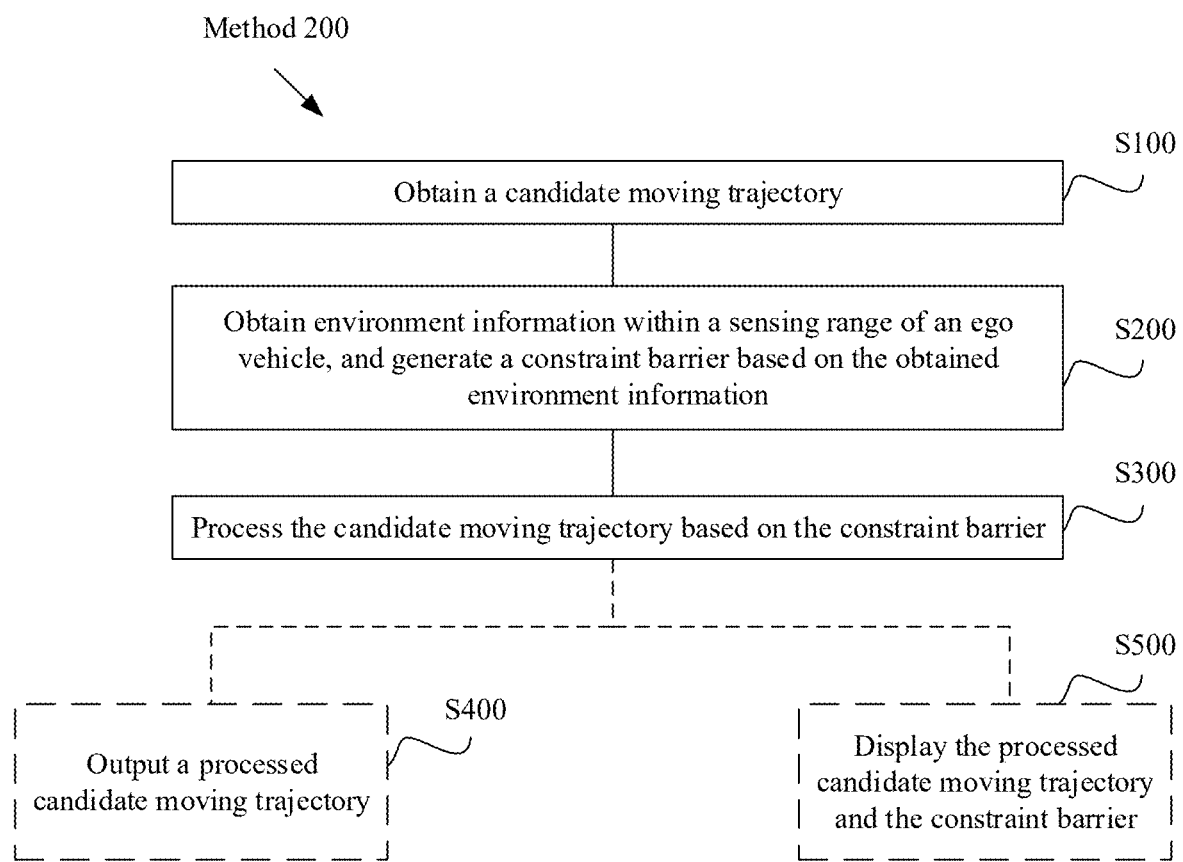
FIG. 3 is a flowchart of a predicted moving trajectory processing method according to an embodiment of this application.

An embodiment of this application provides a predicted moving trajectory processing method, to process a candidate predicted moving trajectory and improve accuracy, reliability, and rationality of the prediction. This may be understood as implementation of the step 2 in the foregoing embodiment. As shown in FIG. 3, the predicted moving trajectory processing method 200 includes the following steps.

S100: Obtain a candidate moving trajectory, where the candidate moving trajectory is a motion trajectory that is of a target object in a future time period and that is obtained by using a prediction method, and the target object is in a sensing range of an ego vehicle. In this embodiment of this application, a method for predicting the candidate moving trajectory is not limited. It should be noted that the sensing range is not an absolute description. In this embodiment of this application, the sensing range of the ego vehicle may include an area that can be sensed by the ego vehicle by using a sensing device or/and a V2X system configured on the ego vehicle. It may also be understood that the sensing range of the ego vehicle is an area that needs to be sensed by the ego vehicle to implement an automated driving/advanced driver assistance function. In actual implementation, optionally, the sensing range indicates an area that can be sensed by the sensing device configured on the ego vehicle and that is around the ego vehicle. Optionally, the sensing range is approximately an area covered by using the ego vehicle as a center and a distance of 30 m as a radius.

S200: Obtain environmental information within the sensing range of the ego vehicle, and generate a constraint barrier based on the obtained environmental information, where the constraint barrier is used to indicate an area in which the target object can be constrained to pass. In this embodiment of this application, the environmental information may be obtained by using the sensing device configured on the ego vehicle, or may be obtained from a cloud device or another vehicle by using the V2X system. In specific implementation, optionally, the vehicle 100 shown in FIG. 1 is used as an example, and the environmental information may be environment data that is collected by the sensing system 110 and then processed by the fusion system 120. Optionally, constraint barriers generated based on different types of environmental information may be classified into a constraint barrier of a hard constraint and a constraint barrier of a soft constraint. The soft constraint barrier may constrain the target object to pass. However, in a special case, the target object may pass through an area indicated by the soft constraint barrier. The target object cannot pass through an area indicated by the hard constraint barrier. It should be noted that, in this embodiment of this application, the constraint barrier is generated in real time based on update of the environmental information. In other words, as the ego vehicle moves, the environment in the sensing range of the ego vehicle also changes accordingly. Correspondingly, the generated constraint barrier also moves with the ego vehicle and is refreshed in real time.

S300: Process the candidate moving trajectory based on the constraint barrier. The candidate moving trajectory inferred by using the prediction method is processed based on the constraint barrier. More environment semantic information can be introduced, to improve accuracy, reliability, and rationality of predicting the moving trajectory.

Optionally, the method further includes a step S400 of outputting a processed candidate moving trajectory. In this embodiment of this application, the processed candidate moving trajectory may be output to a downstream module, for example, the decision-making and planning system 140 shown in FIG. 1.

Figure 4:
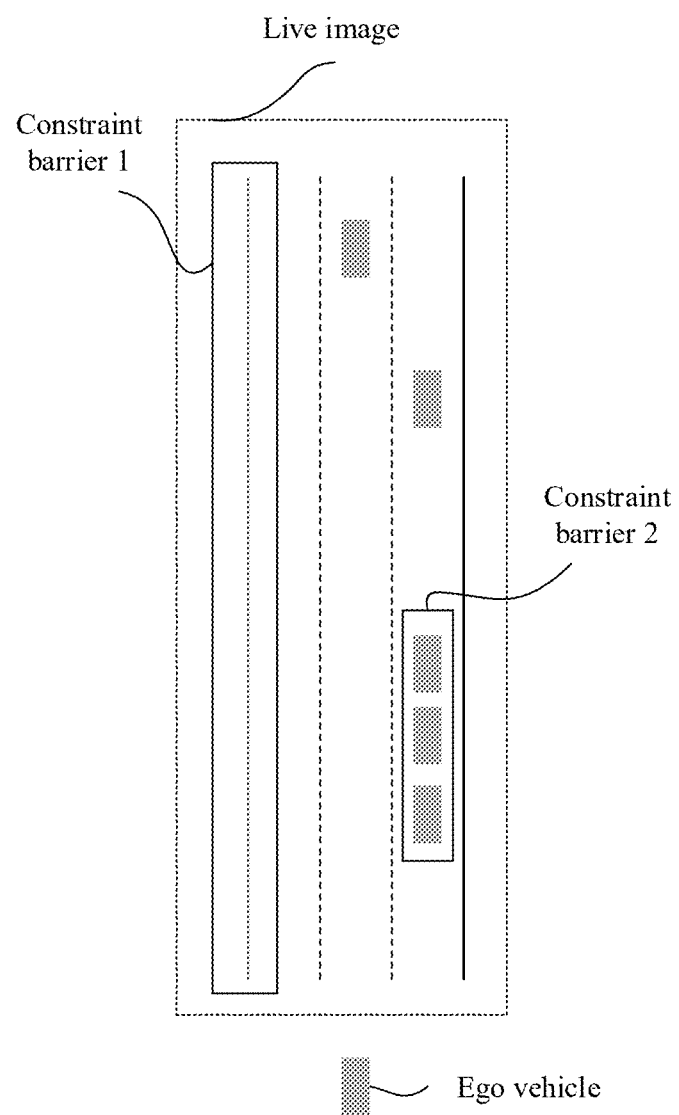
FIG. 4 is a schematic diagram of a live image display according to an embodiment of this application.

Optionally, the method further includes a step S500 of displaying the constraint barrier. Optionally, a live image in the sensing range of the ego vehicle including the constraint barrier is displayed on a display screen. In specific implementation, the live image of the surrounding environment of the ego vehicle may be first obtained, and then the constraint barrier is displayed in a corresponding position in the live image. A user is prompted, in a visual manner, to pay attention to the constraint barrier around the ego vehicle, to improve driving security. In an example, as shown in FIG. 4, a live image of an area in front of the ego vehicle is displayed on the display screen, and the constraint barrier is displayed in the corresponding position in the live image. For example, a constraint barrier 1 is an area of a green belt on a left side of a road, and a constraint barrier 2 is an area in which three vehicles that form a vehicle flow are located in the right front of the ego vehicle. It should be noted that FIG. 4 is merely a simple schematic diagram to describe a display effect. Further, the step S500 specifically includes displaying the processed candidate moving trajectory and the constraint barrier. Optionally, the live image of the surrounding environment of the ego vehicle is first obtained, and then the processed candidate moving trajectory and the constraint barrier are displayed in a corresponding area in the live image in real time, to prompt the user about the environmental information more intuitively and display a prediction result more vividly. Further, moving trajectories processed based on the constraint barriers of different attributes are distinguished by colors. For example, a candidate moving trajectory processed based on a constraint barrier generated based on a vehicle flow may be marked as yellow, and a candidate moving trajectory processed by a constraint barrier generated based on a road boundary may be marked as blue. In addition to distinguishing the constraint barriers of different attributes and/or the processed candidate moving trajectories by using the colors, the constraint barriers of different attributes and/or the processed candidate moving trajectories may also be distinguished in a shining manner.

In this embodiment of this application, the constraint barrier generated in the step S200 includes a hard constraint barrier and a soft constraint barrier.

In an embodiment of this application, optionally, the step S200 specifically includes:

The obtaining environmental information within the sensing range includes obtaining a road boundary of a target road in the sensing range and drivable area drivable area observation information of the target road in the sensing range, where the target road is a road on which the ego vehicle is located.

The generating a constraint barrier based on the environmental information includes: obtaining an occupied road boundary based on the road boundary and the drivable area observation information, where the occupied road boundary indicates a road boundary occupied by an obstacle; and setting the constraint barrier at the occupied road boundary. The constraint barrier generated based on the road boundary and the drivable area observation information is the constraint barrier of the hard constraint attribute.

Further, the obtaining an occupied road boundary based on the road boundary and the drivable area observation information includes: projecting the drivable area observation information onto the road boundary, and converting grid information in observation information projected onto the road boundary into a grid occupation probability of a corresponding grid, where the grid occupation probability indicates a possibility that the corresponding grid is occupied; and obtaining the occupied road boundary based on the grid occupation probability by using a sampling manner and a preset rule.

Further, the obtaining the occupied road boundary based on the grid occupation probability by using a sampling manner and a preset rule includes: performing sampling at intervals of a preset distance along the road boundary to obtain a plurality of sampling points: obtaining a grid occupation probability of a grid in which each of the plurality of sampling points is located: and obtaining the occupied road according to the grid occupation probability of the grid in which each of the plurality of sampling points is located and the preset rule. The preset distance may be set to a value in an interval from 0.2 meters to 1 meter.

Further, the obtaining the occupied road according to the grid occupation probability of the grid in which each of the plurality of sampling points is located and the preset rule includes: determining whether the grid occupation probability of the grid in which each of the plurality of sampling points is located is greater than a preset threshold: and if a grid occupation probability of a grid in which a preset quantity of consecutive or nonconsecutive sampling points in the plurality of sampling points are located is greater than the preset threshold, determining that the road boundary is the occupied road. Optionally, the preset threshold may be set to 0.5.

Figure 5:
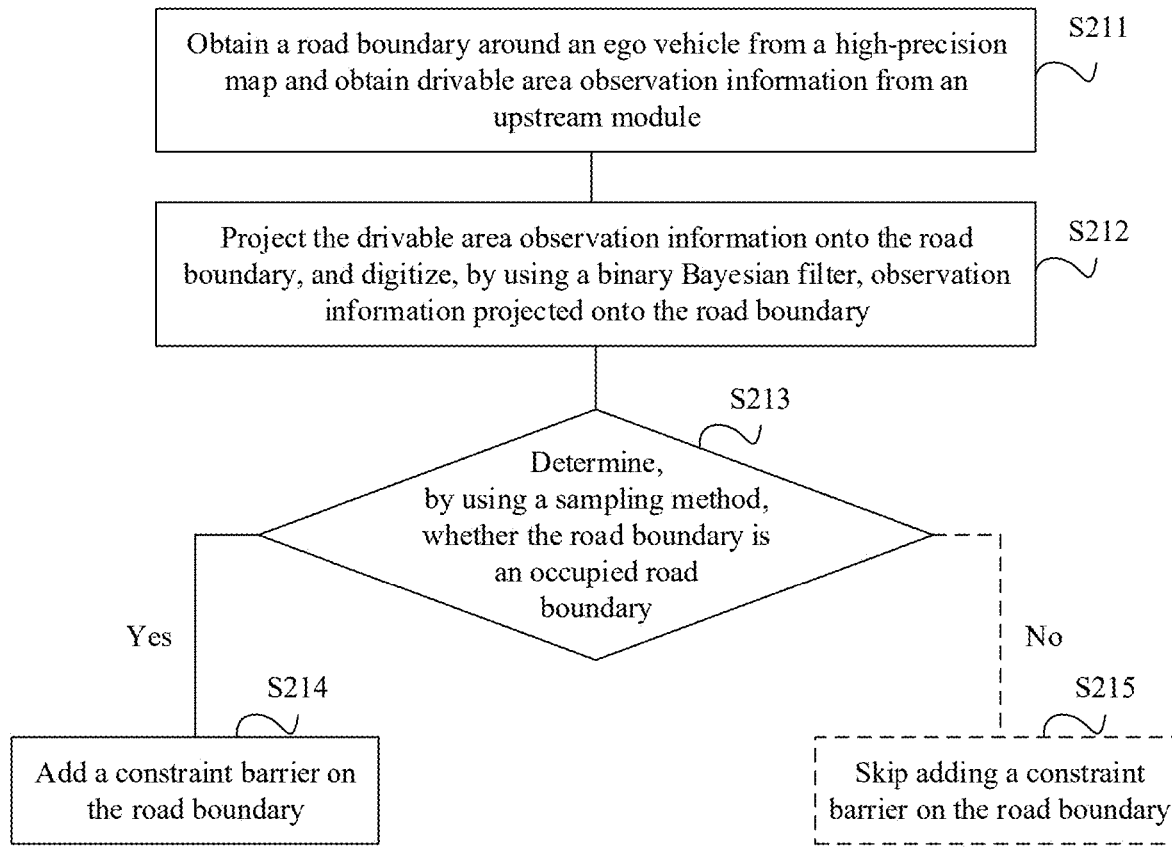
FIG. 5 is a schematic diagram of a flowchart of a constraint barrier generation method according to an embodiment of this application.

Optionally, in a more specific example, as shown in FIG. 5, the step S200 includes the following steps.

Figure 6:
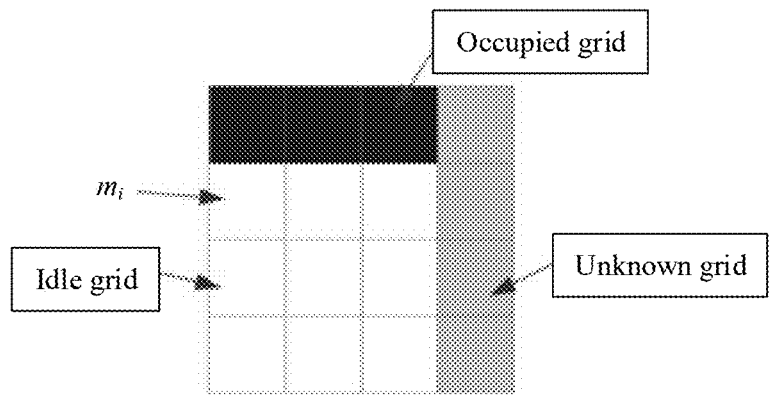
FIG. 6 is a schematic diagram of a drivable area observation information according to an embodiment of this application.

S211: Obtain a road boundary around the ego vehicle from a high-precision map and obtain drivable area observation information from an upstream module (for example, the fusion module 120 shown in FIG. 1). The drivable area observation information is grid-based observation information, and is output by the upstream fusion module. Grids may be classified into an occupied grid, an idle grid, and an unknown grid. As shown in FIG. 6, the occupied grid indicates impassable. Otherwise, the idle grid indicates passable, and $m_i$ indicates an $i^{th}$ grid unit. Optionally, a surrounding area of the ego vehicle may be an area covered by the sensing range of the ego vehicle.

S212: Project the drivable area observation information onto the road boundary, and digitize, by using a binary Bayesian filter, observation information projected onto the road boundary. Details are described as follows:

Initialization: prior occupation probability $$l_0 = \log\frac{p(m_i)}{1 - p(m_i)}$$

Update: occupation probability at a moment $t$ $$l_{t,i} = l_{t-1,i} + \log\frac{p(m_i|z_t, x_t)}{1 - p(m_i|z_t, x_t)} - l_0$$

Calculation: posterior occupation probability $$p(m_i|z_t, x_t) = 1 - \frac{1}{1 + e^{l_{t,i}}}$$

In the formula, $m_i$ represents an $i^{th}$ grid unit, $z_t$ is a measured value at a moment t, $x_t$ is a path at a moment t, and $p(m_i)$ represents a probability that the grid is occupied, namely, a grid occupation probability.

S213: Determine, by using a sampling method, whether the road boundary is an occupied road boundary. Specifically, optionally, a sampling point is generated every 0.5 m on the road boundary. A condition for determining that the road boundary is occupied is as follows: A grid occupation probability of a grid in which at least six consecutive sampling points are located is greater than 0.5, or a grid occupation probability of a grid in which at least 12 nonconsecutive sampling points are located is greater than 0.5. If the condition for determining that the road boundary is occupied is met, namely, if the grid occupation probability of the grid in which the at least six consecutive sampling points are located is greater than 0.5, or the grid occupation probability of the grid in which the at least 12 nonconsecutive sampling points are located is greater than 0.5, the road boundary is the occupied road boundary. Otherwise, if the condition for determining that the road boundary is occupied is not met, the road boundary is not the occupied road boundary.

S214: If the road boundary is the occupied road boundary, add the constraint barrier (for example, the constraint barrier 1 in FIG. 4) on the road boundary.

Optionally, in a step S215, if the road boundary is not the occupied road boundary, skip adding the constraint barrier on the road boundary (for example, there is no constraint barrier on a road boundary represented in a thick black line on the left in FIG. 4).

The foregoing steps S211 to S214 are processed in real time, and the constraint barrier is refreshed in real time as the ego vehicle moves.

In this embodiment of this application, the constraint barrier of the hard constraint is inferred in time domain space based on the map and a drivable area. The constraint barrier is generated with reference to attribute information of the road boundary in the high-precision map and the drivable area observation information, to obtain more environment semantic information. If a road is both the road boundary and the occupied area, the road is an impassable boundary. In this way, scenarios such as a separation belt, a double yellow line, and a vehicle stopped at a roadside on a road can be distinguished.

In another embodiment of this application, optionally, the step S200 specifically includes:

The obtaining environmental information within the sensing range includes obtaining a gap GAP on a target road in the sensing range, where the target road is a road on which the ego vehicle is located, and the GAP is a gap between a front vehicle and a rear vehicle. Optionally, the obtaining a gap GAP on a target road in the sensing range specifically includes: first selecting a lane from all lanes of the target road, and then selecting, from all GAPs on the lane, a GAP that has a shortest distance with the ego vehicle. In specific implementation, a lane adjacent to a lane in which the ego vehicle is located may be selected.

The generating a constraint barrier based on the environmental information specifically includes: calculating a cross probability of the GAP, where the cross probability indicates a possibility that a moving object on the target road may cross the GAP; obtaining a target vehicle flow based on the cross probability and the GAP, where the target vehicle flow includes an area from a front edge of the front vehicle to a rear edge of the rear vehicle in vehicles before and after the GAP; and setting the constraint barrier at the target vehicle flow. According to the technical solution, a smaller GAP indicates a lower cross probability, and a higher probability of forming the vehicle flow by the vehicles before and after the GAP. The constraint barrier generated by the vehicle flow formed by the vehicles before and after the GAP is the soft constraint barrier.

Further, the obtaining a target vehicle flow based on the cross probability and the GAP specifically includes: determining whether the cross probability is less than a preset threshold; and if the cross probability is less than the preset cross probability threshold, forming the vehicle flow by the vehicles before and after the GAP, in other words, determining the area from the front edge of the front vehicle to the rear edge of the rear vehicle in the vehicles before and after the GAP as the target vehicle flow. Optionally, the preset cross probability threshold may be set to 0.5. In this embodiment of this application, a longer vehicle flow may be obtained based on a plurality of GAPs. For example, cross probabilities of two adjacent GAPs formed by three vehicles in a same lane are less than the preset cross probability threshold. Therefore, the area from a front edge of a front vehicle to a rear edge of a rear vehicle of the three vehicles form a vehicle flow, and the constraint barrier (the constraint barrier 2 shown in FIG. 4) is added to the vehicle flow formed by the three vehicles.

Further, the calculating a cross probability of the GAP includes evaluating whether the vehicles before and after the GAP form a vehicle flow to obtain an evaluation result, and calculating the cross probability of the GAP based on the evaluation result.

Figure 7:
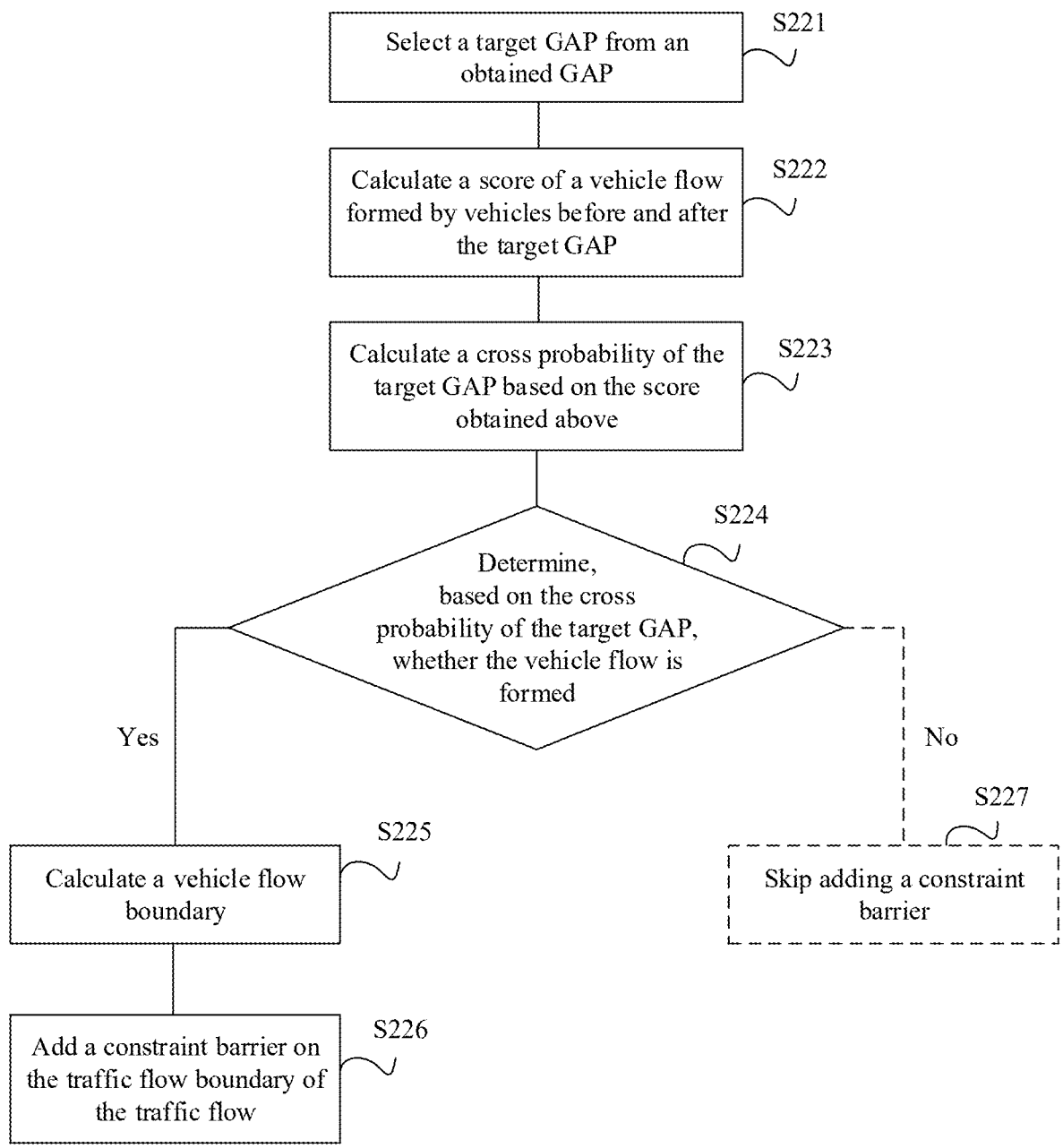
FIG. 7 is a flowchart of another constraint barrier generation method according to an embodiment of this application.

Optionally, in a more specific example, processing of one GAP is used as an example. As shown in FIG. 7, the step S200 includes the following steps.

S221: Select a target GAP from an obtained GAP. Specifically, a GAP closest to the ego vehicle may be selected from a selected lane.

S222: Calculate a score of a vehicle flow formed by vehicles before and after the target GAP, where a formula is as follows:

score=$w_1 * f(\text{gap}) + w_2 * f(v_{frontedge}) + w_3 * f(v_{rearedge})$

Figure 8:
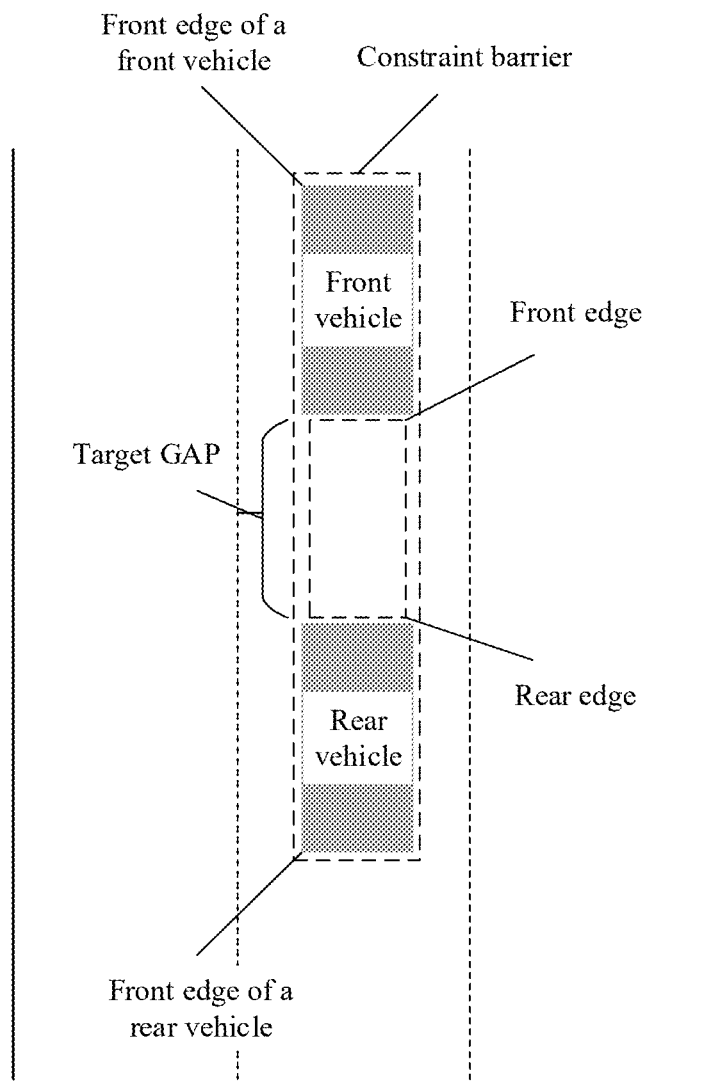
FIG. 8 is a schematic diagram of a GAP according to an embodiment of this application.

As shown in FIG. 8, a size of a gap is a distance between a front edge front edge and a rear edge rear edge, $v_{frontedge}$ is a moving speed of the front edge, and $v_{rearedge}$ is a moving speed of the rear edge. In this embodiment of this application, $v_{frontedge}$ may be a speed of a front vehicle corresponding to the GAP, and $v_{rearedge}$ may be a speed of a rear vehicle corresponding to the GAP.

S223: Calculate a cross probability of the target GAP based on the score obtained above, where a formula is as follows:

Observation probability: $P(\text{cross}|\text{gap}) = \text{sigmoid}(\text{score})$ Cross probability of the gap at a moment t:

$$P(Z_t) = P(\text{cross}|\text{gap}) * P(Z_t|Z_{t-1}) * P(Z_{t-1})$$

Transfer probability

Cross probability of the gap at a moment (t-1)

S224: Determine, based on the cross probability of the target GAP, whether the vehicle flow is formed. Specifically, whether the cross probability of the target GAP is less than 0.5 is determined, and if the cross probability of the target GAP is less than 0.5, the vehicle flow is formed. Otherwise, the vehicle flow is not formed.

S225: If the vehicle flow is formed, calculate a vehicle flow boundary. Optionally, widths of the vehicles before and after the GAP are used as a width of the vehicle flow, and a distance from the front edge of the front vehicle to the rear edge of the rear vehicle in the vehicles before and after the GAP is used as a length of the vehicle flow.

S226: Add the constraint barrier, for example, a constraint barrier shown in FIG. 8, on the vehicle flow boundary of the vehicle flow.

Optionally, S227: If the vehicle flow is not formed, skip adding the constraint barrier.

In a scenario of an unprotected left-turn intersection, the ego vehicle directly travels. Face-to-face vehicles that turn left are densely distributed to form a stable vehicle flow. In this embodiment of this application, the soft constraint barrier based on the vehicle flow is added to the vehicle flow boundary, to improve a right of way of the vehicle flow relative to a single-vehicle, reduce a probability that a trajectory of the single-vehicle passes through the vehicle flow barrier, and infer more accurate behavior of preempt or giving a way.

In another embodiment of this application, optionally, the step S200 specifically includes:

The obtaining environmental information within the sensing range specifically includes: obtaining a state of a traffic signal light on a target road in the sensing range, where the target road is a road on which the ego vehicle is located, and the state of the traffic signal light includes a passable state and an impassable state.

The generating a constraint barrier based on the environmental information includes: setting the constraint barrier at a stop line of a lane corresponding to a traffic signal light in the impassable state. The constraint barrier generated based on the state of traffic signal light is the soft constraint, and is configured to restrain dynamic driving behavior and reduce an irrational prediction result. In addition, the soft constraint can be broken when a traffic participant violates a traffic rule. Therefore, violation can be taken into account.

Figure 9:
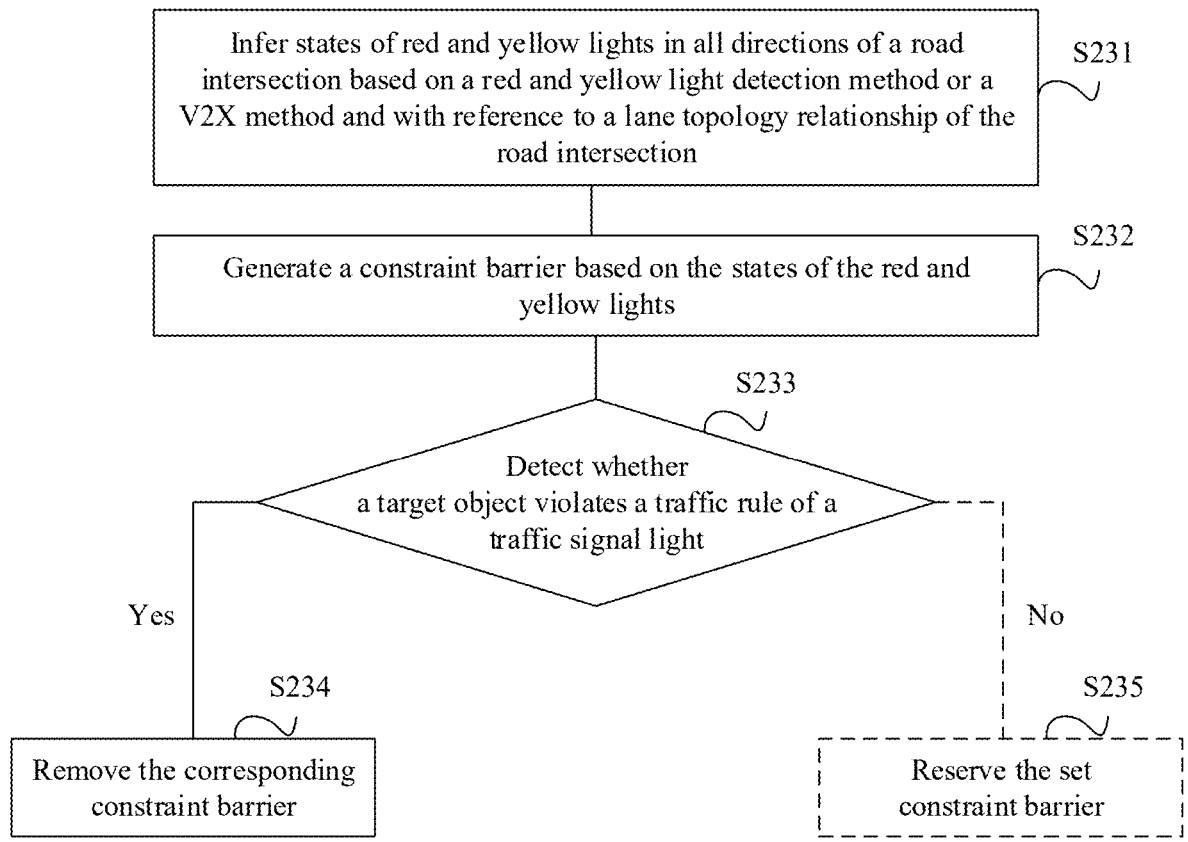
FIG. 9 is a flowchart of another constraint barrier generation method according to an embodiment of this application.

Optionally, in a more specific example, a traffic signal and the like are red and yellow lights. As shown in FIG. 9, the step S200 includes the following steps.

S231: Infer states of red and yellow lights in all directions of a road intersection based on a red and yellow light detection method or a V2X method and with reference to a lane topology relationship of the road intersection.

S232: Generate the constraint barrier based on the states of the red and yellow lights. Optionally, if a lane in which the ego vehicle is located corresponds to a red light, the constraint barrier is set at a stop line of the lane in which the ego vehicle is located and a lane in a same direction as the lane in which the ego vehicle is located. If a lane in which the ego vehicle is located corresponds to a green light and is a straight lane, the constraint barrier is set at a stop line of a left-turn lane opposite to the lane in which the ego vehicle is located. If a lane in which the ego vehicle is located corresponds to a green light and is a left-turn lane, the constraint barrier is set at a stop line of a straight lane opposite to the lane in which the ego vehicle is located. If a lane in which the ego vehicle is located corresponds to a green light and is a straight lane, the constraint barrier is set at a stop line of a straight lane and/or a left-turn lane on a side of the lane in which the ego vehicle is located.

S233: Detect whether the target object violates a traffic rule of a traffic signal light, for example, whether the target object runs in the red light.

S234: If the target object is detected to violate the traffic rule of the traffic signal light, remove the corresponding constraint barrier, namely, skip setting the constraint barrier. For example, if the target object violates the rule of no passing of the red light corresponding to a lane 1, the constraint barrier set at a stop line of the intersection for the lane 1 may be removed.

S235: If the target object is detected to not violate the traffic rule of the traffic signal light, reserve the set constraint barrier.

In a scenario of a protected left-turn intersection, the left-turn lane of the ego vehicle is in the green light, and it can be inferred that a face-to-face straight lane is in the red light at this moment. If the moving object does not violate the traffic rule, it can be predicted that the moving object will brake before the stop line. In this embodiment of this application, the constraint barrier is added at a stop line position on the face-to-face straight lane, to constrain the moving object crossing the stop line, to avoid that an ego vehicle point slows down or even a brake caused by a predicted trajectory intrusion of the moving object.

In an embodiment of this application, optionally, the step S300 specifically includes: determining whether the candidate moving trajectory intersects the constraint barrier; and if the candidate moving trajectory intersects the constraint barrier, reducing a prediction result probability of the candidate moving trajectory. The candidate moving trajectory output by using the prediction method usually has a corresponding prediction result probability. The prediction result probability is used to represent a possibility that a predicted candidate moving trajectory is a real moving trajectory of the target object. For example, in practice, a decision-making and planning module may configure a weight of the corresponding candidate moving trajectory in decision-making and planning based on the prediction result probability.

In another embodiment of this application, optionally, the step S300 specifically includes: determining whether the candidate moving trajectory intersects the constraint barrier: and if the candidate moving trajectory intersects the constraint barrier, truncating the candidate moving trajectory at a position at which the candidate moving trajectory intersects the constraint barrier.

Further, before the truncating the candidate moving trajectory at a position at which the candidate moving trajectory intersects the constraint barrier, the step S300 further includes: determining, based on a speed of the target object and preset deceleration, whether the target object moving along the candidate moving trajectory can brake before touching the constraint barrier; and obtaining that the target object moving along the candidate moving trajectory cannot brake before touching the constraint barrier.

Further, the truncating the candidate moving trajectory at a position at which the candidate moving trajectory intersects the constraint barrier specifically includes: obtaining a first intersection point, where the first intersection point is an intersection point that is closest to a start end of the candidate moving trajectory and that is in intersection points of the candidate moving trajectory and the constraint barrier; and truncating the candidate moving trajectory at the first intersection point.

In another embodiment of this application, optionally, the step S300 specifically includes: determining whether the candidate moving trajectory intersects the constraint barrier;

and if the candidate moving trajectory intersects the constraint barrier, bypassing the candidate moving trajectory along the constraint barrier.

Further, before the bypassing the candidate moving trajectory along the constraint barrier, the step S300 further includes: determining, based on a speed of the target object and preset deceleration, whether the target object moving along the candidate moving trajectory can brake before touching the constraint barrier; and obtaining that the target object moving along the candidate moving trajectory can brake before touching the constraint barrier.

In another embodiment of this application, optionally, the step S300 specifically includes: determining whether the candidate moving trajectory intersects the constraint barrier; and if the candidate moving trajectory intersects the constraint barrier, processing the candidate moving trajectory.

In this embodiment of this application, the candidate moving trajectory obtained in the step S100 is inferred by using the prediction method. In practice, the prediction method is used to output a plurality of candidate moving trajectories. Optionally, in the step S300, all the candidate moving trajectories obtained in the step S100 may be processed based on the constraint barrier. The predicted candidate moving trajectory is processed by using the constraint barrier, to improve accuracy, reliability, and rationality of prediction of a finally output candidate moving trajectory.

Figure 10:
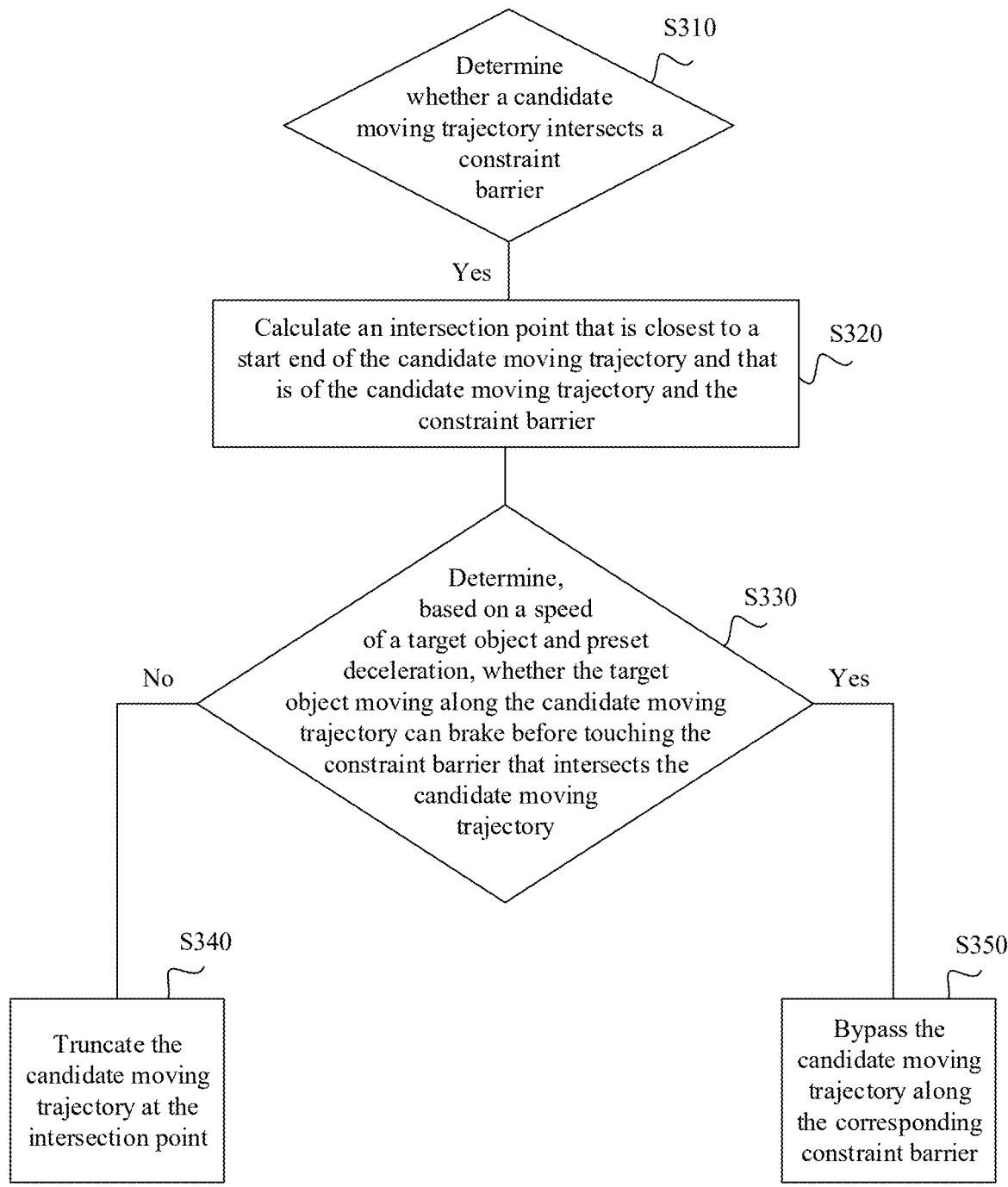
FIG. 10 is a flowchart of a candidate moving trajectory processing method according to an embodiment of this application.

Optionally, in a more specific example, processing of one candidate moving trajectory is used as an example. As shown in FIG. 10, the step S300 specifically includes the following steps.

S310: Determine whether the candidate moving trajectory intersects the generated constraint barrier, namely, whether the constraint barrier that intersects the candidate moving trajectory exists in the generated constraint barrier. If the predicted candidate moving trajectory intersects the constraint barrier, it indicates that if the target object moves along the candidate moving trajectory, the target object crosses the constraint barrier or passes through an area in actual space corresponding to the constraint barrier in the future. However, in practice, the target object does not pass through the area in the actual space corresponding to the constraint barrier. Therefore, such a candidate moving trajectory needs to be processed, so that the trajectory prediction result is more realistic. It may be understood that determining whether the candidate moving trajectory intersects all the generated constraint barriers is a prerequisite for processing the candidate moving trajectory below. In practice, the prediction method can be used to output the plurality of candidate moving trajectories. In this embodiment of this application, only a candidate moving trajectory that meets an intersection condition is processed, to remove, change, or reduce a prediction result probability of an irrational candidate moving trajectory.

S320: If the candidate moving trajectory intersects a constraint barrier, calculate an intersection point that is closest to a start end of the candidate moving trajectory and that is of the candidate moving trajectory and the constraint barrier. It may be understood that if the candidate moving trajectory intersects several constraint barriers, corresponding intersection points are separately calculated. If the candidate moving trajectory does not intersect any constraint barrier, the candidate moving trajectory does not need to be processed.

S330: Determine, based on a speed of the target object and preset deceleration, whether the target object moving along the candidate moving trajectory can brake before touching the constraint barrier that intersects the candidate moving trajectory. To be specific, whether the target object that moves along the candidate moving trajectory can be reduced to 0 at preset deceleration before arriving at the intersection point calculated in the step S320. The preset deceleration should be maximum reasonable deceleration, and may be set to 3 m/s$^2$.

Figure 11:
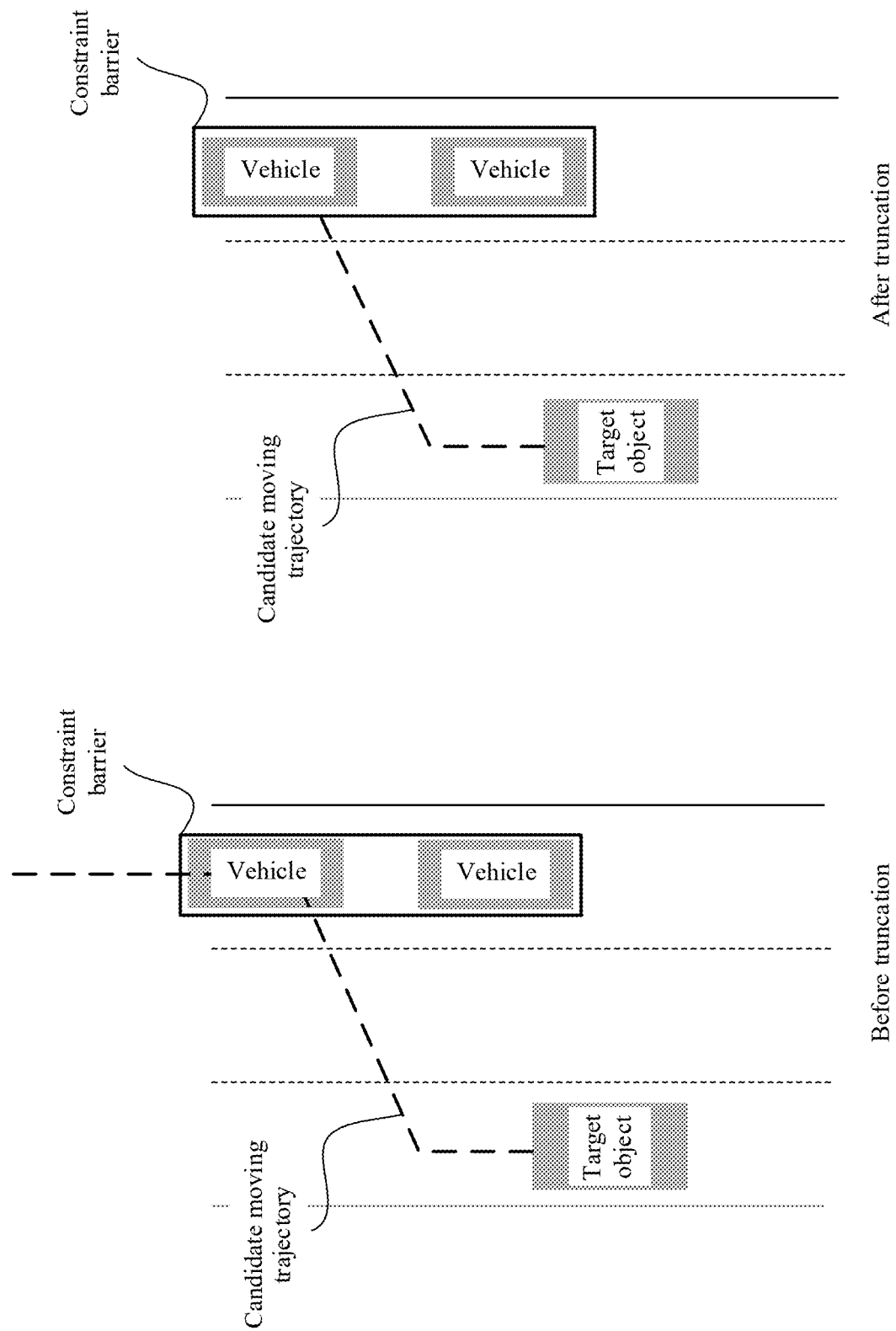
FIG. 11 is a schematic diagram of comparison before and after truncation according to an embodiment of this application.

S340: If the target object cannot brake, truncate the candidate moving trajectory at the intersection point calculated in the step S320. In specific implementation, the truncation indicates clearing a trajectory point between an intersection point and an end point of the candidate moving trajectory. In an example, FIG. 11 is a schematic diagram of comparison before and after the truncation.

Figure 12:
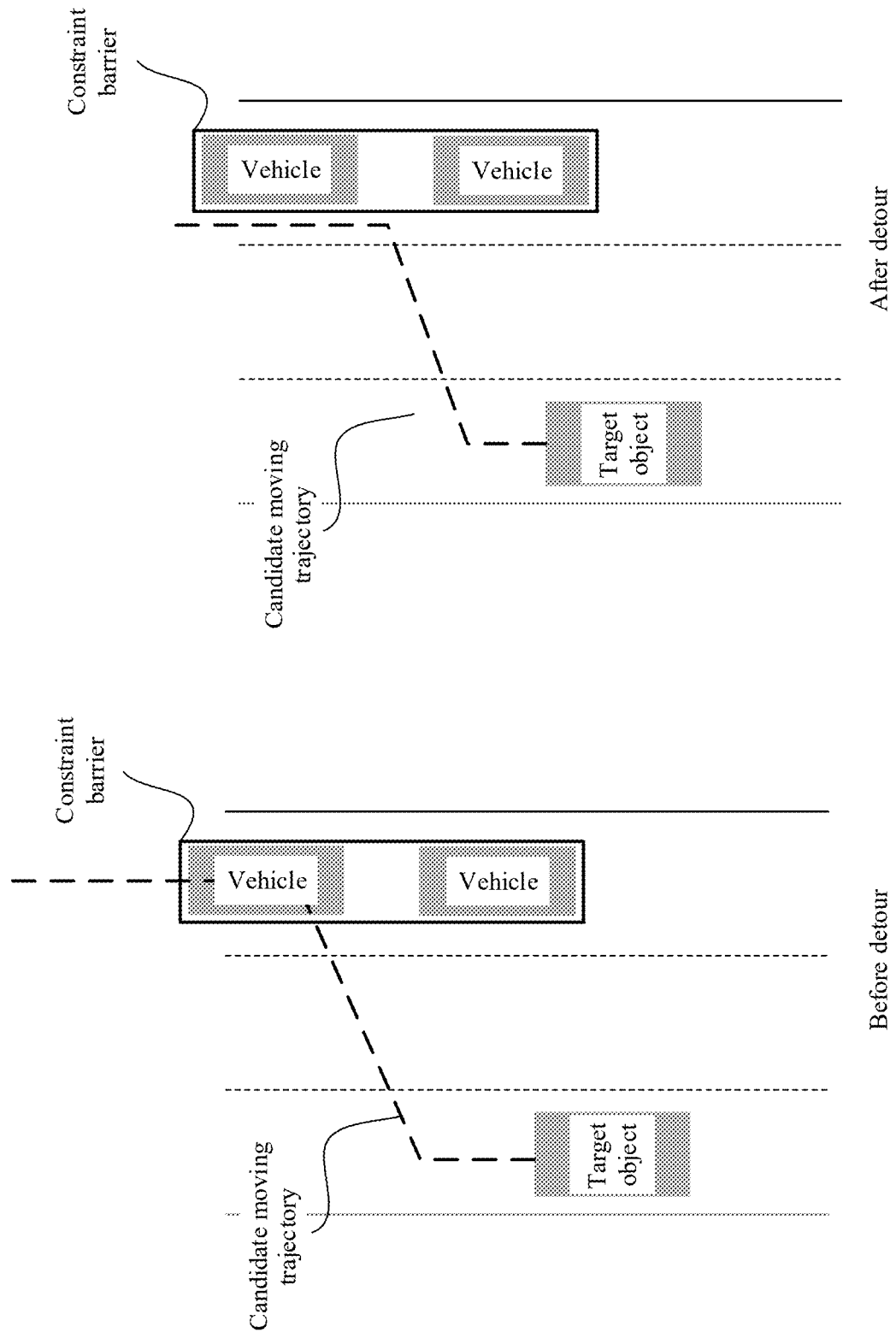
FIG. 12 is a schematic diagram of comparison before and after bypass according to an embodiment of this application.

S350: If the target object can brake, bypass the candidate moving trajectory along the corresponding constraint barrier, to avoid the constraint barrier. In specific implementation, a bypass trajectory segment may be obtained by translating the constraint barrier. In an example, FIG. 12 is a schematic diagram of comparison before and after the bypass.

In conclusion, the moving object trajectory prediction method provided in this embodiment of this application can improve accuracy and rationality of predicting the moving trajectory.

Figure 13:
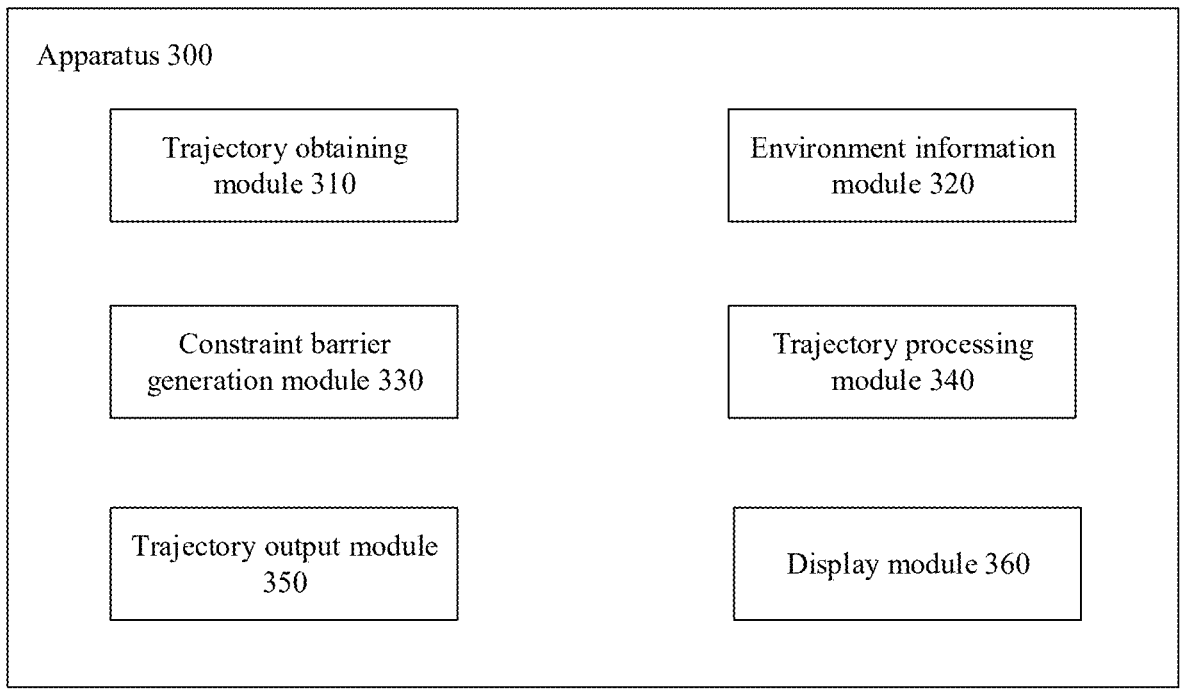
FIG. 13 is a schematic diagram of a structure of a predicted moving trajectory processing apparatus according to an embodiment of this application.

An embodiment of this application provides a predicted moving trajectory processing apparatus 300 mainly configured to implement the predicted moving trajectory processing method 200 described in the foregoing embodiment. As shown in FIG. 13, the apparatus 300 includes:

a trajectory obtaining module 310, configured to obtain a candidate moving trajectory, where the candidate moving trajectory is a motion trajectory that is of a target object in a future time period and that is obtained by using a prediction method, and the target object is in a sensing range of an ego vehicle; an environmental information module 320, configured to obtain environmental information within the sensing range; a constraint barrier generation module 330, configured to generate a constraint barrier based on the environmental information obtained by the environmental information module 320, where the constraint barrier is used to indicate an area in which the target object can be constraint to pass; and a trajectory processing module 340, configured to process, based on the constraint barrier generated by the constraint barrier generation module 330, the candidate moving trajectory obtained by the trajectory obtaining module 310.

Optionally, the environmental information module 320 is specifically configured to obtain a road boundary of a target road in the sensing range and drivable area drivable area observation information of the target road in the sensing range, where the target road is a road on which the ego vehicle is located. The constraint barrier generation module 330 is specifically configured to obtain an occupied road boundary based on the road boundary and the drivable area observation information that are obtained by the environmental information module 320, where the occupied road boundary indicates a road boundary occupied by an obstacle, and set the constraint barrier at the occupied road boundary.

Further, the constraint barrier generation module 330 is specifically configured to: project the drivable area observation information onto the road boundary, and convert grid information in observation information projected onto the road boundary into a grid occupation probability of a corresponding grid, where the grid occupation probability indicates a possibility that the corresponding grid is occupied; and obtain the occupied road boundary based on the grid occupation probability by using a sampling manner and a preset rule.

Further, the constraint barrier generation module 330 is specifically configured to: perform sampling at intervals of a preset distance along the road boundary to obtain a plurality of sampling points; obtain a grid occupation probability of a grid in which each of the plurality of sampling points is located; and obtain the occupied road according to the grid occupation probability of the grid in which each of the plurality of sampling points is located and the preset rule.

Further, the constraint barrier generation module 330 is specifically configured to: determine whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determine that the road boundary is the occupied road.

Optionally, the environmental information module 320 is specifically configured to obtain a gap GAP on a target road in the sensing range, where the target road is a road on which the ego vehicle is located, and the GAP is a gap between a front vehicle and a rear vehicle. The constraint barrier generation module 330 is specifically configured to: calculate a cross probability of the GAP obtained by the environmental information module 320, where the cross probability indicates a possibility that a moving object on the target road may cross the GAP; obtain a target vehicle flow based on the cross probability and the GAP, where the target vehicle flow includes an area from a front edge of the front vehicle to a rear edge of the rear vehicle in vehicles before and after the GAP; and set the constraint barrier at the target vehicle flow.

Further, the constraint barrier generation module 330 is specifically configured to evaluate whether the vehicles before and after the GAP form a vehicle flow to obtain an evaluation result, and calculate the cross probability of the GAP based on the evaluation result.

Optionally, the environmental information module 320 is specifically configured to obtain a state of a traffic signal light on a target road in the sensing range, where the target road is a road on which the ego vehicle is located, and the state of the traffic signal light includes a passable state and an impassable state. The constraint barrier generation module 330 is specifically configured to set the constraint barrier at a stop line of a lane corresponding to a traffic signal light in the impassable state.

Optionally, the trajectory processing module 340 is specifically configured to: determine whether the candidate moving trajectory intersects the constraint barrier; and if the candidate moving trajectory intersects the constraint barrier, reduce a prediction result probability of the candidate moving trajectory.

Optionally, the trajectory processing module 340 is specifically configured to: determine whether the candidate moving trajectory intersects the constraint barrier; and if the candidate moving trajectory intersects the constraint barrier, truncate the candidate moving trajectory at a position at which the candidate moving trajectory intersects the constraint barrier. Optionally, the trajectory processing module 340 is further configured to obtain, based on a speed of the target object and preset deceleration, that the target object moving along the candidate moving trajectory cannot brake before touching the constraint barrier. Further, the trajectory processing module 340 is specifically configured to: obtain a first intersection point, where the first intersection point is an intersection point that is closest to a start end of the candidate moving trajectory and that is in intersection points of the candidate moving trajectory and the constraint barrier; and truncate the candidate moving trajectory at the first intersection point.

Optionally, the trajectory processing module 340 is specifically configured to: determine whether the candidate moving trajectory intersects the constraint barrier; and if the candidate moving trajectory intersects the constraint barrier, bypass the candidate moving trajectory along the constraint barrier. Optionally, the trajectory processing module 340 is further configured to obtain, based on a speed of the target object and preset deceleration, that the target object moving along the candidate moving trajectory can brake before touching the constraint barrier.

Optionally, the trajectory processing module 340 is specifically configured to: determine whether the candidate moving trajectory intersects the constraint barrier; and if the candidate moving trajectory intersects the constraint barrier, process the candidate moving trajectory.

Optionally, the apparatus 300 further includes a trajectory output module 350 configured to output a processed candidate moving trajectory.

Optionally, the apparatus 300 further includes a display module 360 configured to display an image including a positional relationship between the ego vehicle and the constraint barrier.

The apparatus 300 described in this embodiment of this application is configured to implement all steps of the predicted moving trajectory processing method 200 described in the embodiments corresponding to FIG. 3 to FIG. 12. For more detailed descriptions of the embodiment corresponding to FIG. 13, refer to corresponding content described in the embodiments corresponding to FIG. 3 to FIG. 12. Details are not described herein again.

Figure 14:
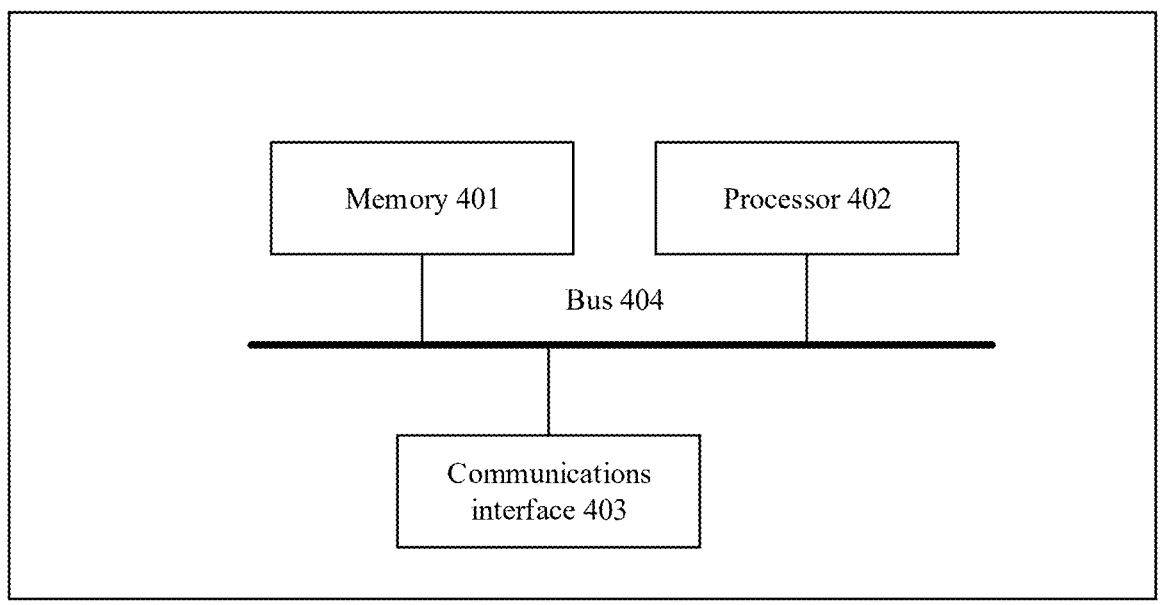
FIG. 14 is a schematic diagram of a structure of a predicted moving trajectory processing device according to an embodiment of this application.

An embodiment of this application provides a predicted moving trajectory processing device. As shown in FIG. 14, the predicted moving trajectory processing device 400 may implement the predicted moving trajectory processing method 200 described in the embodiments corresponding to FIG. 3 to FIG. 12. The predicted moving trajectory processing device 400 includes: a memory 401, a processor 402, a communications interface 403, and a bus 404. Communication connections between the memory 401, the processor 402, and the communications interface 403 are implemented through the bus 404. The processor 402 invokes a program stored in the memory 401 to implement all steps of the predicted moving trajectory processing method 200 described in the embodiments corresponding to FIG. 3 to FIG. 12. For detailed content, refer to corresponding content described in the embodiments corresponding to FIG. 3 to FIG. 12. Details are not described herein again.

Figure 15:
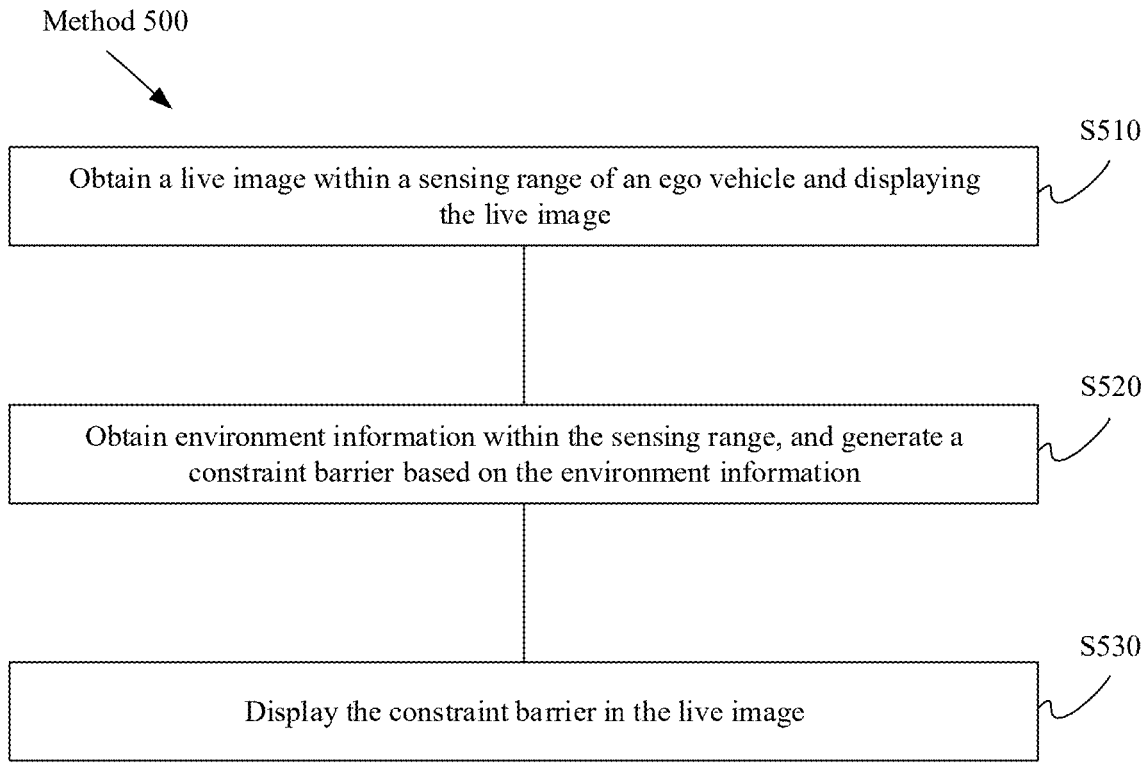
FIG. 15 is a flowchart of a constraint barrier display method according to an embodiment of this application.

An embodiment of this application provides a constraint barrier display method. As shown in FIG. 15, the method 500 may include the following steps.

S510: Obtain a live image of a sensing range of an ego vehicle and display the live image. Optionally, the live image may be obtained by using a camera configured on the ego vehicle.

S520: Obtain environmental information within the sensing range, and generate a constraint barrier based on the environmental information, where the constraint barrier is used to indicate an area in which a moving object can be constrained to pass.

S530: Display the constraint barrier in the live image. Optionally, a live image of the sensing range of the ego vehicle including the constraint barrier is displayed on a display screen. In specific implementation, the live image of a surrounding environment of the ego vehicle may be first obtained, and then the constraint barrier is displayed in a corresponding position in the live image. A user is prompted, in a visual manner, to pay attention to the constraint barrier around the ego vehicle, to improve driving security. In an example, as shown in FIG. 4, a live image of an area in front of the ego vehicle is displayed on the display screen, and the constraint barrier is displayed in the corresponding position in the live image. For example, a constraint barrier 1 is an area of a green belt on a left side of a road, and a constraint barrier 2 is an area in which three vehicles that form a vehicle flow are located in the right front of the ego vehicle. It should be noted that FIG. 4 is merely a simple schematic diagram to describe a display effect. Further, the step S500 specifically includes displaying a processed candidate moving trajectory and the constraint barrier. Optionally, the live image of the surrounding environment of the ego vehicle is first obtained, and then the processed candidate moving trajectory and the constraint barrier are displayed in a corresponding area in the live image in real time, to prompt the user about the environmental information more intuitively and display the prediction result more vividly. Further, moving trajectories processed based on constraint barriers of different attributes are distinguished by colors. For example, a candidate moving trajectory processed based on a constraint barrier generated based on a vehicle flow may be marked as yellow, and a candidate constraint barrier processed based on a constraint barrier generated based on a road boundary may be marked as blue. In addition to distinguishing the constraint barriers of different attributes and/or the processed candidate moving trajectories by using the colors, the constraint barriers of different attributes and/or the processed candidate moving trajectories may also be distinguished in a shining manner.

Optionally, in a specific example, the obtaining environmental information within a sensing range specifically includes obtaining a road boundary of a target road in the sensing range and drivable area drivable area observation information of the target road in the sensing range, where the target road is a road on which the ego vehicle is located.

The generating a constraint barrier based on the environmental information specifically includes obtaining an occupied road boundary based on the road boundary and the drivable area observation information, where the occupied road boundary indicates a road boundary occupied by an obstacle, and setting the constraint barrier at the occupied road boundary.

Further, the obtaining an occupied road boundary based on the road boundary and the drivable area observation information specifically includes projecting the drivable area observation information onto the road boundary, and converting grid information in observation information projected onto the road boundary into a grid occupation probability of a corresponding grid, where the grid occupation probability indicates a possibility that the corresponding grid is occupied, and obtaining the occupied road boundary based on the grid occupation probability by using a sampling manner and a preset rule.

Further, the obtaining the occupied road boundary based on the grid occupation probability by using a sampling manner and a preset rule specifically includes performing sampling at intervals of a preset distance along the road boundary to obtain a plurality of sampling points, obtaining a grid occupation probability of a grid in which each of the plurality of sampling points is located, and obtaining the occupied road according to the grid occupation probability of the grid in which each of the plurality of sampling points is located and the preset rule.

Further, the obtaining the occupied road according to the grid occupation probability of the grid in which each of the plurality of sampling points is located and the preset rule includes: determining whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determining that the road boundary is the occupied road.

Optionally, in another specific example, the obtaining environmental information within a sensing range specifically includes obtaining a gap GAP on a target road in the sensing range, where the target road is a road on which the ego vehicle is located, and the GAP is a gap between a front vehicle and a rear vehicle.

The generating a constraint barrier based on the environmental information specifically includes: calculating a cross probability of the GAP, where the cross probability indicates a possibility that a moving object on the target road may cross the GAP; obtaining a target vehicle flow based on the cross probability and the GAP, where the target vehicle flow includes an area from a front edge of the front vehicle to a rear edge of the rear vehicle in vehicles before and after the GAP; and setting the constraint barrier at the target vehicle flow.

Further, the calculating a cross probability of the GAP specifically includes: evaluating whether the vehicles before and after the GAP form a vehicle flow to obtain an evaluation result; and calculating the cross probability of the GAP based on the evaluation result.

Optionally, in another specific example, the obtaining environmental information within a sensing range specifically includes obtaining a state of a traffic signal light on a target road in the sensing range, where the target road is a road on which the ego vehicle is located, and the state of the traffic signal light includes a passable state and an impassable state.

The generating a constraint barrier based on the environmental information specifically includes setting the constraint barrier at a stop line of a lane corresponding to a traffic signal light in the impassable state.

For more detailed content of the step S520 in the constraint barrier display method 500 provided in the embodiment corresponding to FIG. 15, refer to related description of the step S200 in the predicted moving trajectory processing method 200 described in the embodiment corresponding to FIG. 3. Details are not described herein again.

According to the constraint barrier display method 500 provided in this embodiment of this application, the live image including the constraint barrier is displayed to intuitively present a user with an environment condition around the ego vehicle, to improve driving security and interaction experience.

Figure 16:
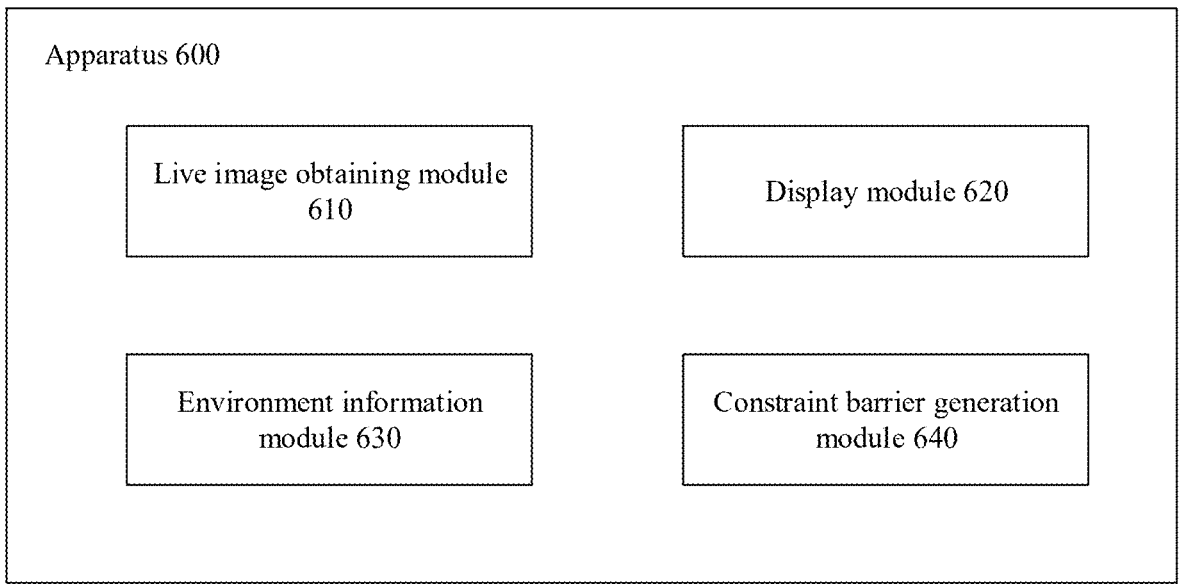
FIG. 16 is a schematic diagram of a structure of a constraint barrier display apparatus according to an embodiment of this application.

An embodiment of this application provides a constraint barrier display apparatus 600 mainly configured to implement the constraint barrier display method 500 described in the foregoing embodiment. As shown in FIG. 16, the apparatus 600 includes:

a live image obtaining module 610, configured to obtain a live image of a sensing range of an ego vehicle; a display module 620, configured to display the live image; an environmental information module 630, configured to obtain environmental information within the sensing range; and a constraint barrier generation module 640, configured to generate a constraint barrier based on the environmental information obtained by the environmental information module 630, where the constraint barrier is used to indicate an area in which a moving object can be constrained to pass, and the display module 620 is further configured to display the constraint barrier in the live image.

Optionally, the environmental information module 630 is specifically configured to obtain a road boundary of a target road in the sensing range and drivable area drivable area observation information of the target road in the sensing range, where the target road is a road on which the ego vehicle is located. The constraint barrier generation module 640 is specifically configured to: obtain an occupied road boundary based on the road boundary and the drivable area observation information, where the occupied road boundary indicates a road boundary occupied by an obstacle; and set the constraint barrier at the occupied road boundary.

Further, the constraint barrier generation module 640 is specifically configured to: project the drivable area observation information onto the road boundary, and convert grid information in observation information projected onto the road boundary into a grid occupation probability of a corresponding grid, where the grid occupation probability indicates a possibility that the corresponding grid is occupied; and obtain the occupied road boundary based on the grid occupation probability by using a sampling manner and a preset rule.

Further, the constraint barrier generation module 640 is specifically configured to: perform sampling at intervals of a preset distance along the road boundary to obtain a plurality of sampling points; obtain a grid occupation probability of a grid in which each of the plurality of sampling points is located; and obtain the occupied road according to the grid occupation probability of the grid in which each of the plurality of sampling points is located and the preset rule.

Further, the constraint barrier generation module 640 is specifically configured to: determine whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determine that the road boundary is the occupied road.

Optionally, the environmental information module 630 is specifically configured to obtain a gap GAP on a target road in the sensing range, where the target road is a road on which the ego vehicle is located, and the GAP is a gap between a front vehicle and a rear vehicle. The constraint barrier generation module 640 is specifically configured to: calculate a cross probability of the GAP, where the cross probability indicates a possibility that a moving object on the target road may cross the GAP; obtain a target vehicle flow based on the cross probability and the GAP, where the target vehicle flow includes an area from a front edge of the front vehicle to a rear edge of the rear vehicle in vehicles before and after the GAP; and set the constraint barrier at the target vehicle flow.

Further, the constraint barrier generation module 640 is specifically configured to: evaluate whether the vehicles before and after the GAP form a vehicle flow to obtain an evaluation result; and calculate the cross probability of the GAP based on the evaluation result.

Optionally, the environmental information module 630 is specifically configured to obtain a state of a traffic signal light on a target road in the sensing range, where the target road is a road on which the ego vehicle is located, and the state of the traffic signal light includes a passable state and an impassable state. The constraint barrier generation module 640 is specifically configured to set the constraint barrier at a stop line of a lane corresponding to a traffic signal light in the impassable state.

The constraint barrier display apparatus 600 described in this embodiment of this application can implement all steps of the constraint barrier display method 500 described in the foregoing embodiment. For related descriptions, refer to the descriptions of the method 500 described in the embodiment corresponding to FIG. 15. Details are not described herein again.

Figure 17:
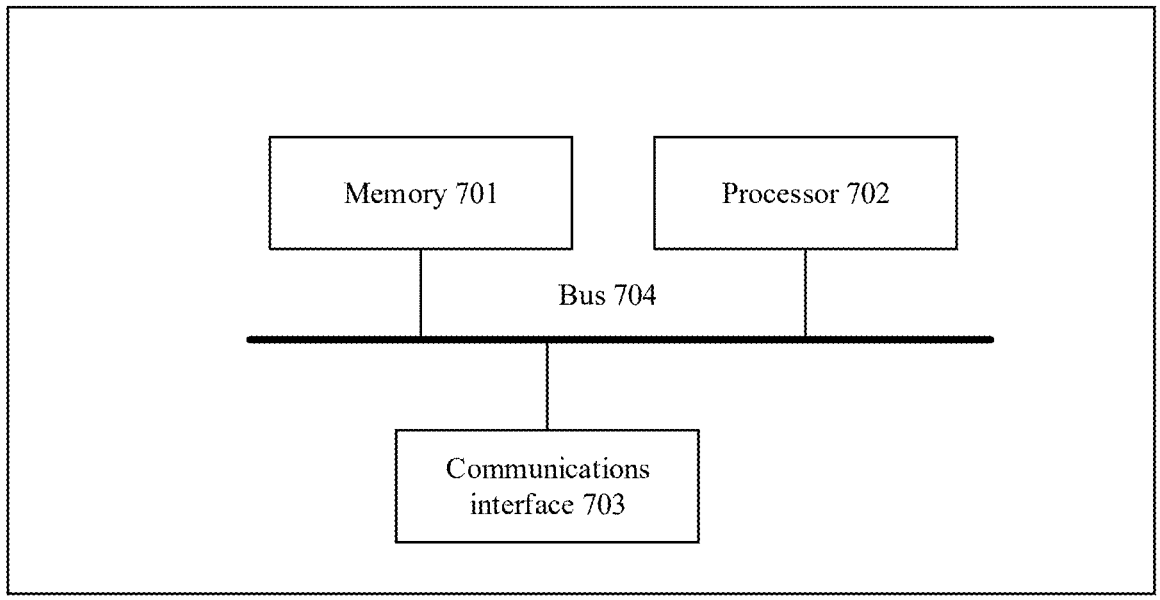
FIG. 17 is a schematic diagram of a structure of a constraint barrier display device according to an embodiment of this application.

An embodiment of this application provides a constraint barrier display device. As shown in FIG. 17, the constraint barrier display device 700 may implement the constraint barrier display method 500 described in the embodiment corresponding to FIG. 15. The constraint barrier display device 700 includes a memory 701, a processor 702, a communications interface 703, and a bus 704. Communication connections between the memory 701, the processor 702, and the communications interface 703 are implemented through the bus 704. The processor 702 invokes a program stored in the memory 701 to implement all steps of the constraint barrier display method 500 described in the embodiment corresponding to FIG. 15. For detailed content, refer to corresponding content described in the embodiment corresponding to FIG. 15. Details are not described herein again.

Figure 18:
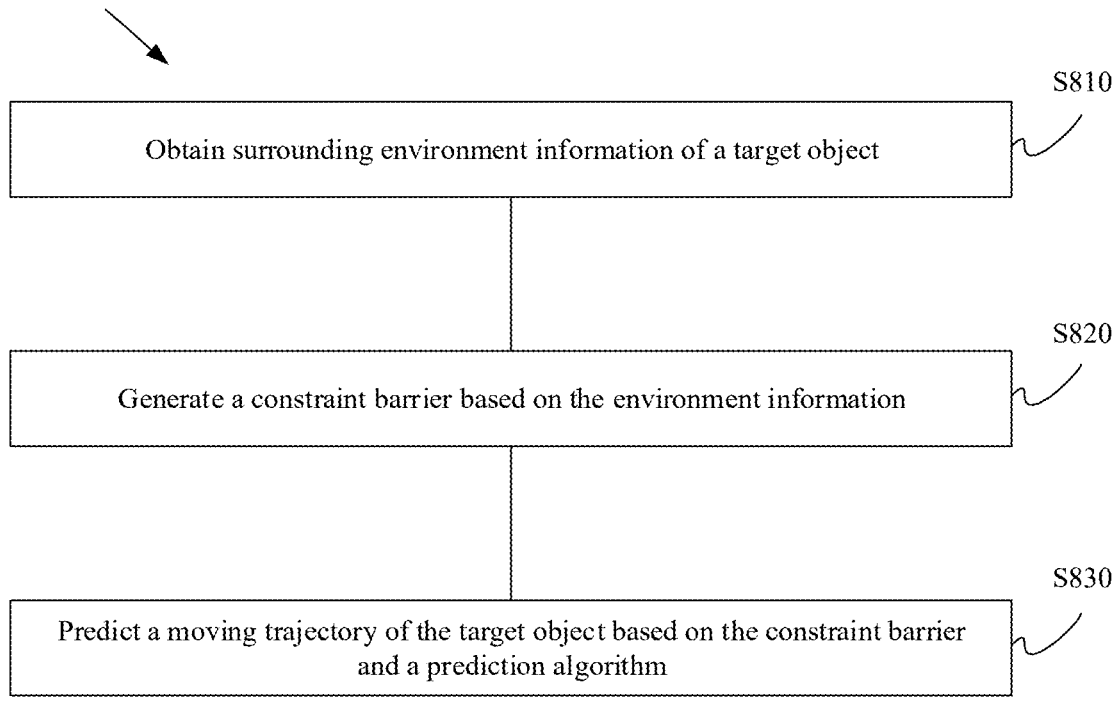
FIG. 18 is a flowchart of a moving trajectory prediction method according to an embodiment of this application.

An embodiment of this application provides a moving trajectory prediction method. As shown in FIG. 18, the method 800 may include the following steps.

S810: Obtain surrounding environmental information of a target object. Optionally, a sensing device configured on the ego vehicle may obtain the surrounding environmental information of the target object, or a V2X system may obtain from a cloud device, a target vehicle, or another vehicle, the surrounding environmental information of the target object. A specific obtaining method is not limited.

S820: Generate a constraint barrier based on the environmental information, where the constraint barrier is used to indicate an area in which the target object can be constrained to pass.

S830: Predict a trajectory prediction of the target object based on the constraint barrier and a prediction algorithm. The prediction algorithm is not limited, and may be that the constraint barrier is used as data input to a trained neural network to output the moving trajectory of the target object.

Optionally, the step S810 specifically includes obtaining a road boundary of a target road and drivable area drivable area observation information of the target road. The step S820 specifically includes obtaining an occupied road boundary based on the road boundary and the drivable area observation information, where the occupied road boundary indicates a road boundary occupied by an obstacle, and setting the constraint barrier at the occupied road boundary.

Further, the obtaining an occupied road boundary based on the road boundary and the drivable area observation information specifically includes: projecting the drivable area observation information onto the road boundary, and converting grid information in observation information projected onto the road boundary into a grid occupation probability of a corresponding grid, where the grid occupation probability indicates a possibility that the corresponding grid is occupied; and obtaining the occupied road boundary based on the grid occupation probability by using a sampling manner and a preset rule.

Further, the obtaining the occupied road boundary based on the grid occupation probability by using a sampling manner and a preset rule specifically includes: performing sampling at intervals of a preset distance along the road boundary to obtain a plurality of sampling points; obtaining a grid occupation probability of a grid in which each of the plurality of sampling points is located; and obtaining the occupied road according to the grid occupation probability of the grid in which each of the plurality of sampling points is located and the preset rule.

Further, the obtaining the occupied road according to the grid occupation probability of the grid in which each of the plurality of sampling points is located and the preset rule includes: determining whether the grid occupation probability of the grid in which each of the plurality of sampling points is located is greater than a preset threshold; and if a grid occupation probability of a grid in which a preset quantity of consecutive or nonconsecutive sampling points in the plurality of sampling points are located is greater than the preset threshold, determining that the road boundary is the occupied road.

Optionally, the step S810 specifically includes: obtaining a gap GAP on a surrounding road of the target object, where the GAP is a gap between a front vehicle and a rear vehicle. The step S820 specifically includes: calculating a cross probability of the GAP, where the cross probability indicates a possibility that a moving object on a target road may cross the GAP; obtaining a target vehicle flow based on the cross probability and the GAP, where the target vehicle flow includes an area from a front edge of the front vehicle to a rear edge of the rear vehicle in vehicles before and after the GAP; and setting the constraint barrier at the target vehicle flow.

Further, the calculating a cross probability of the GAP specifically includes: evaluating whether the vehicles before and after the GAP form a vehicle flow to obtain an evaluation result; and calculating the cross probability of the GAP based on the evaluation result.

Optionally, the step S810 specifically includes obtaining a state of a traffic signal light on a surrounding road of the target object, where the state of the traffic signal light includes a passable state and an impassable state. The step S820 specifically includes setting the constraint barrier at a stop line of a lane corresponding to a traffic signal light in the impassable state. Optionally, if the state of the traffic signal light corresponding to the ego vehicle is a red light, the constraint barrier is set at a stop line of a lane in which the ego vehicle is located and a lane in a same direction as the lane in which the ego vehicle is located. If the state of the traffic signal light corresponding to the ego vehicle is a green light and a lane in which the ego vehicle is located is a straight lane, the constraint barrier is set at a stop line of a left-turn lane opposite to the lane in which the ego vehicle is located. If the state of the traffic signal light corresponding to the ego vehicle is a green light and a lane in which the ego vehicle is located is a left-turn lane, the constraint barrier is set at a stop line of a straight lane opposite to the lane in which the ego vehicle is located. If the state of the traffic signal light corresponding to the ego vehicle is a green light and a lane in which the ego vehicle is located is a straight lane, the constraint barrier is set at a stop line of a straight lane and/or a left-turn lane on a side of the lane in which the ego vehicle is located. The method may further include: detecting whether the target object violates a traffic rule of the traffic signal light; and if the target object is detected to violate the traffic rule of the traffic signal light, removing the constraint barrier, namely, skipping setting the constraint barrier.

For more detailed content of steps S810 and S820 in the moving trajectory prediction method 800 provided in the embodiment corresponding to FIG. 18, refer to related description of the step S200 in the predicted moving trajectory processing method 200 described in the embodiment corresponding to FIG. 3. Details are not described herein again.

An embodiment of this application provides a moving trajectory prediction apparatus, configured to implement the method 800 described in the embodiment corresponding to FIG. 18. The apparatus includes modules/units that can implement the method 800 described in the embodiment corresponding to FIG. 18. The apparatus may be implemented by software, hardware, or a combination of software and hardware.

An embodiment of this application provides a moving trajectory prediction device, including a processor and a memory. The processor is coupled to the memory. The memory is configured to store a program. The processor is configured to execute the program in the memory, so that the device performs the method 800 described in the embodiment corresponding to FIG. 18.

An embodiment of this application further provides a storage medium, including a program. When the program runs on a computer, the computer is enabled to perform all steps of any one of the methods described in the foregoing embodiments.

It should be noted that the apparatuses/devices described in the foregoing embodiments may be implemented by a same apparatus/device, or may be different apparatuses/devices. The apparatus 300 and the apparatus 600 described in the foregoing embodiments may be implemented by software, hardware, or a combination of software and hardware.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for predicting moving trajectory of a target object, comprising:
   obtaining a candidate moving trajectory, wherein the candidate moving trajectory is a motion trajectory of the target object in future period, the candidate moving trajectory is obtained by a prediction method, the target object is within a sensing range of an ego vehicle, and the ego vehicle is different from the target object;
   obtaining environmental information within the sensing range;
   generating a constraint barrier based on the environmental information, wherein the constraint barrier is used to indicate an area through which the target object is constrained to pass, the constraint barrier comprises at least one of a hard constraint barrier and a soft constraint barrier, the target object is not able to pass through an area indicated by the hard constraint barrier, and the target object is able to pass through an area indicated by the soft constraint barrier;

processing the candidate moving trajectory based on the constraint barrier; and performing autonomous driving of the ego vehicle based on the processed candidate moving trajectory of the target object, wherein the obtaining environmental information within the sensing range comprises:

obtaining a state of a traffic signal light on a target road in the sensing range, wherein the target road is a road on which the ego vehicle is located, and the state of the traffic signal light comprises a passable state and an impassable state; and wherein the generating a constraint barrier based on the environmental information comprises:

removing the constraint barrier in response to determining that the target object violates a traffic rule indicated by the state of the traffic signal light.

2. The method according to claim 1, wherein the obtaining environmental information within the sensing range further comprises:

obtaining a road boundary of a target road in the sensing range and drivable area observation information of the target road in the sensing range, wherein the target road is a road on which the ego vehicle is located; and the generating a constraint barrier based on the environmental information further comprises:

obtaining an occupied road boundary based on the road boundary and the drivable area observation information, wherein the occupied road boundary indicates a road boundary occupied by an obstacle, and setting the constraint barrier at the occupied road boundary.

3. The method according to claim 2, wherein the obtaining an occupied road boundary based on the road boundary and the drivable area observation information comprises:

projecting the drivable area observation information onto the road boundary;

converting grid information in observation information projected onto the road boundary into a grid occupation probability of a corresponding grid, wherein the grid occupation probability indicates a possibility that the corresponding grid is occupied; and obtaining the occupied road boundary based on the grid occupation probability by using a sampling manner and a preset rule.

4. The method according to claim 3, wherein the obtaining the occupied road boundary based on the grid occupation probability by using a sampling manner and a preset rule comprises:

performing sampling at intervals of a preset distance along the road boundary to obtain a plurality of sampling points;

obtaining a grid occupation probability of a grid in which each of the plurality of sampling points is located; and obtaining the occupied road boundary according to the grid occupation probability of the grid in which each of the plurality of sampling points is located and the preset rule.

5. The method according to claim 4, wherein the obtaining the occupied road boundary according to the grid occupation probability of the grid in which each of the plurality of sampling points is located and the preset rule comprises:

determining whether the grid occupation probability of the grid in which each of the plurality of sampling points is located is greater than a preset threshold; and when a grid occupation probability of a grid in which a preset quantity of consecutive or nonconsecutive sampling points in the plurality of sampling points are located is greater than the preset threshold, determining that the road boundary is the occupied road boundary.

6. The method according to claim 1, wherein the obtaining environmental information within the sensing range further comprises:

obtaining a gap on a target road in the sensing range, wherein the target road is a road on which the ego vehicle is located, and the gap is a gap between a front vehicle and a rear vehicle; and the generating a constraint barrier based on the environmental information further comprises:

calculating a cross probability of the gap, wherein the cross probability indicates a possibility that a moving object on the target road may cross the gap;

obtaining a target vehicle flow based on the cross probability and the gap, wherein the target vehicle flow comprises an area from a front edge of the front vehicle to a rear edge of the rear vehicle in vehicles before and after the gap; and setting the constraint barrier at the target vehicle flow.

7. The method according to claim 6, wherein the calculating a cross probability of the gap comprises:

evaluating whether the vehicles before and after the gap form a vehicle flow to obtain an evaluation result; and calculating the cross probability of the gap based on the evaluation result.

8. The method according to claim 1, wherein the generating a constraint barrier based on the environmental information further comprises:

setting the constraint barrier at a stop line of a lane corresponding to a traffic signal light in the impassable state.

9. The method according to claim 8, wherein the processing the candidate moving trajectory based on the constraint barrier comprises:

determining whether the candidate moving trajectory intersects the constraint barrier; and when the candidate moving trajectory intersects the constraint barrier, reducing a prediction result probability of the candidate moving trajectory.

10. The method according to claim 8, wherein the processing the candidate moving trajectory based on the constraint barrier comprises:

determining whether the candidate moving trajectory intersects the constraint barrier; and when the candidate moving trajectory intersects the constraint barrier, truncating the candidate moving trajectory at a position at which the candidate moving trajectory intersects the constraint barrier.

11. The method according to claim 1, wherein the hard constraint barrier is related to a road boundary and a drivable area observation information.

12. The method according to claim 1, wherein the soft constraint barrier is related to a vehicle flow or by a state of traffic signal light.

13. The method according to claim 1, wherein the generating a constraint barrier based on the environmental information further comprises:

reserving the constraint barrier in response to determining that the target object follows the traffic rule indicated by the state of the traffic signal light.

14. A non-transitory computer-readable storage medium, comprising a program, wherein when the program runs on a computer, the computer is enabled to perform operations comprising:
  obtaining a candidate moving trajectory, wherein the candidate moving trajectory is a motion trajectory of a target object in future period, the candidate moving trajectory is obtained by a prediction method, the target object is within a sensing range of an ego vehicle, and the ego vehicle is different from the target object;
  obtaining environmental information within the sensing range;
  generating a constraint barrier based on the environmental information, wherein the constraint barrier is used to indicate an area through which the target object is constrained to pass, wherein the constraint barrier comprises at least one of a hard constraint barrier and a soft constraint barrier, the target object is not able to pass through an area indicated by the hard constraint barrier, and the target object is able to pass through an area indicated by the soft constraint barrier;
  processing the candidate moving trajectory based on the constraint barrier; and
  performing autonomous driving of the ego vehicle based on the processed candidate moving trajectory of the target object,
  wherein the obtaining environmental information within the sensing range comprises;
    obtaining a state of a traffic signal light on a target road in the sensing range, wherein the target road is a road on which the ego vehicle is located, and the state of the traffic signal light comprises a passable state and an impassable state; and
  wherein the generating a constraint barrier based on the environmental information comprises:
    removing the constraint barrier in response to determining that the target object violates a traffic rule indicated by the state of the traffic signal light.

15. The non-transitory computer-readable storage medium according to claim 14, wherein the obtaining environmental information within the sensing range further comprises:
  obtaining a road boundary of a target road in the sensing range and drivable area observation information of the target road in the sensing range, wherein the target road is a road on which the ego vehicle is located; and
  the generating a constraint barrier based on the environmental information further comprises:
    obtaining an occupied road boundary based on the road boundary and the drivable area observation information, wherein the occupied road boundary indicates a road boundary occupied by an obstacle, and
    setting the constraint barrier at the occupied road boundary.

16. The non-transitory computer-readable storage medium according to claim 15, wherein the obtaining an occupied road boundary based on the road boundary and the drivable area observation information comprises:
  projecting the drivable area observation information onto the road boundary;
  converting grid information in observation information projected onto the road boundary into a grid occupation probability of a corresponding grid, wherein the grid occupation probability indicates a possibility that the corresponding grid is occupied; and
  obtaining the occupied road boundary based on the grid occupation probability by using a sampling manner and a preset rule.

17. The non-transitory computer-readable storage medium according to claim 16, wherein the obtaining the occupied road boundary based on the grid occupation probability by using a sampling manner and a preset rule comprises:
  performing sampling at intervals of a preset distance along the road boundary to obtain a plurality of sampling points;
  obtaining a grid occupation probability of a grid in which each of the plurality of sampling points is located; and
  obtaining the occupied road boundary according to the grid occupation probability of the grid in which each of the plurality of sampling points is located and the preset rule.

18. An apparatus for predicting moving trajectory of a target object, comprising:
  one or more processors; and
  a non-transitory computer readable medium storing a program to be executed by the one or more processors, wherein the program comprises instructions that when executed by the one or more processors, cause the apparatus to perform operations comprising:
    obtaining a candidate moving trajectory, wherein the candidate moving trajectory is a motion trajectory of the target object in future period, the candidate moving trajectory is obtained by a prediction method, the target object is within a sensing range of an ego vehicle, and the ego vehicle is different from the target object;
    obtaining environmental information within the sensing range;
    generating a constraint barrier based on the environmental information, wherein the constraint barrier is used to indicate an area through which the target object is constrained to pass, wherein the constraint barrier comprises at least one of a hard constraint barrier and a soft constraint barrier, the target object is not able to pass through an area indicated by the hard constraint barrier, and the target object is able to pass through an area indicated by the soft constraint barrier;
    processing the candidate moving trajectory based on the constraint barrier; and
    performing autonomous driving of the ego vehicle based on the processed candidate moving trajectory of the target object,
    wherein the obtaining environmental information within the sensing range comprises:
      obtaining a state of a traffic signal light on a target road in the sensing range, wherein the target road is a road on which the ego vehicle is located, and the state of the traffic signal light comprises a passable state and an impassable state; and
    wherein the generating a constraint barrier based on the environmental information comprises:
      removing the constraint barrier in response to determining that the target object violates a traffic rule indicated by the state of the traffic signal light.

19. The apparatus according to claim 18, wherein the obtaining environmental information within the sensing range further comprises:
  obtaining a road boundary of a target road in the sensing range and drivable area observation information of the target road in the sensing range, wherein the target road is a road on which the ego vehicle is located; and the generating a constraint barrier based on the environmental information further comprises:

obtaining an occupied road boundary based on the road boundary and the drivable area observation information, wherein the occupied road boundary indicates a road boundary occupied by an obstacle, and setting the constraint barrier at the occupied road boundary.

20. The apparatus according to claim 19, wherein the obtaining an occupied road boundary based on the road boundary and the drivable area observation information comprises:

projecting the drivable area observation information onto the road boundary;

converting grid information in observation information projected onto the road boundary into a grid occupation probability of a corresponding grid, wherein the grid occupation probability indicates a possibility that the corresponding grid is occupied; and obtaining the occupied road boundary based on the grid occupation probability by using a sampling manner and a preset rule.

* * * * *